(12) United States Patent
Zhang et al.

(10) Patent No.: US 11,365,322 B2
(45) Date of Patent: Jun. 21, 2022

(54) FLAME RETARDANT CLEAR COATINGS FOR BUILDING PANELS

(71) Applicant: ARMSTRONG WORLD INDUSTRIES, INC., Lancaster, PA (US)

(72) Inventors: Linzhu Zhang, Pittsburgh, PA (US); John E. Hughes, Lincoln University, PA (US); Michelle X. Wang, Lititz, PA (US); Steven L. Masia, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 218 days.

(21) Appl. No.: 15/994,067

(22) Filed: May 31, 2018

(65) Prior Publication Data

US 2018/0346738 A1 Dec. 6, 2018

Related U.S. Application Data

(60) Provisional application No. 62/653,897, filed on Apr. 6, 2018, provisional application No. 62/513,115, filed (Continued)

(51) Int. Cl.
*C09D 5/18* (2006.01)
*C09D 133/06* (2006.01)
(Continued)

(52) U.S. Cl.
CPC ............... *C09D 5/18* (2013.01); *B32B 21/00* (2013.01); *C09D 7/61* (2018.01); *C09D 7/63* (2018.01);
(Continued)

(58) Field of Classification Search
None
See application file for complete search history.

(56) References Cited

U.S. PATENT DOCUMENTS

| | | | |
|---|---|---|---|
| 3,440,201 A | 4/1969 | Sempert et al. | |
| 3,669,729 A * | 6/1972 | Seiner | B01D 67/0079 428/314.4 |

(Continued)

FOREIGN PATENT DOCUMENTS

| | | |
|---|---|---|
| CN | 104530892 A | 4/2015 |
| EP | 3458640 A1 | 3/2019 |

(Continued)

OTHER PUBLICATIONS

Corresponding International Search Report for PCT/US2018/035322, dated Sep. 27, 2018. WO.

(Continued)

*Primary Examiner* — Tae H Yoon
(74) *Attorney, Agent, or Firm* — Craig M. Sterner

(57) ABSTRACT

Described herein is a barrier coating composition comprising an organic blend comprising a first component and a second component, the first component comprising latex polymer and the second component being selected from polyurethane emulsion, wax emulsion, and alkyd emulsion, wherein the first component and the second component are present in a weight ratio ranging from about 2:1 to about 20:1, and the latex polymer has a glass transition temperature of less than about 18° C.

17 Claims, 8 Drawing Sheets

Related U.S. Application Data on May 31, 2017, provisional application No. 62/513,126, filed on May 31, 2017.

(51) Int. Cl.

| | | |
|---|---|---|
| *C09D 175/14* | (2006.01) | |
| *C09D 7/63* | (2018.01) | |
| *E04B 1/94* | (2006.01) | |
| *E04B 9/04* | (2006.01) | |
| *E04C 2/296* | (2006.01) | |
| *B32B 21/00* | (2006.01) | |
| *C09D 7/61* | (2018.01) | |
| *E04B 9/16* | (2006.01) | |
| *E04B 9/36* | (2006.01) | |
| *E04C 2/52* | (2006.01) | |
| *C08K 3/22* | (2006.01) | |
| *C08K 3/38* | (2006.01) | |
| *E04C 2/26* | (2006.01) | |
| *C08F 230/08* | (2006.01) | |

(52) U.S. Cl.
CPC ......... *C09D 133/06* (2013.01); *C09D 175/14* (2013.01); *E04B 1/942* (2013.01); *E04B 9/045* (2013.01); *E04B 9/16* (2013.01); *E04B 9/366* (2013.01); *E04C 2/526* (2013.01); *C08F 230/085* (2020.02); *C08K 2003/2227* (2013.01); *C08K 2003/387* (2013.01); *E04C 2/26* (2013.01); *E04C 2/296* (2013.01)

(56) References Cited

U.S. PATENT DOCUMENTS

| | | | |
|---|---|---|---|
| 4,126,473 A | | 11/1978 | Sobolev et al. |
| 4,472,462 A | * | 9/1984 | Apice ................... B05C 17/00 |
| | | | 260/DIG. 38 |
| 4,888,057 A | | 12/1989 | Nguyen et al. |
| 5,837,089 A | * | 11/1998 | Magrum ............. B32B 37/1207 |
| | | | 156/275.5 |
| 8,092,858 B2 | * | 1/2012 | Smith ...................... B32B 13/14 |
| | | | 156/45 |
| 8,206,620 B1 | | 6/2012 | Bolton et al. |
| 8,835,546 B2 | * | 9/2014 | Li ........................ C09D 127/06 |
| | | | 524/500 |
| 9,938,401 B2 | * | 4/2018 | de Boer .................. C08L 23/12 |
| 10,167,408 B2 | * | 1/2019 | Satgurunathan ........ C08L 33/08 |
| 10,487,218 B2 | * | 11/2019 | Couturier ............. C09D 109/08 |
| 2002/0071867 A1 | | 6/2002 | Gebhard et al. |
| 2004/0002559 A1 | | 1/2004 | Troutman et al. |
| 2004/0180998 A1 | | 9/2004 | Gonzales et al. |
| 2008/0041003 A1 | | 2/2008 | Nowak et al. |
| 2009/0242854 A1 | * | 10/2009 | Li ........................ C09D 11/101 |
| | | | 252/519.33 |
| 2010/0016479 A1 | | 1/2010 | Li |
| 2010/0223878 A1 | | 9/2010 | Lipka et al. |
| 2012/0301622 A1 | | 11/2012 | Fang et al. |
| 2015/0018472 A1 | | 1/2015 | Gaston |
| 2020/0056052 A1 | * | 2/2020 | Zha ........................ D21H 19/18 |

FOREIGN PATENT DOCUMENTS

| | | |
|---|---|---|
| EP | 3532677 A4 | 5/2020 |
| GB | 1375247 * | 11/1974 |
| KR | 20140079745 A | 6/2014 |
| WO | WO 2007/024699 A2 | 3/2007 |
| WO | WO 2015/157278 A1 | 10/2015 |
| WO | 2017/109174 A1 | 6/2017 |

OTHER PUBLICATIONS

EPO Search Report for corresponding application No. EP 18810449.0 dated Feb. 18, 2021.
Chinese Search Report for corresponding application No. CN2018800401018 dated Oct. 27, 2021.

* cited by examiner

FLAME RETARDANT CLEAR COATINGS FOR BUILDING PANELS

CROSS-REFERENCE TO RELATED APPLICATIONS

This application claims the benefit of U.S. Provisional Application No. 62/653,897, filed on Apr. 6, 2018, as well as U.S. Provisional Patent Application No. 62/513,126, filed on May 31, 2017, as well as U.S. Provisional Application No. 62/513,115, filed on May 31, 2017. The disclosures of the above applications are incorporated herein by reference.

BACKGROUND

Building products for interior room environments balance interests with respect to cosmetic value, material cost, structural integrity, and fire safety. Previously, maximizing one or two of the aforementioned interests required sacrificing the remaining interests. For example, a building panel that uses natural materials (e.g., natural grain from real wood, as compared to replica grain from printed wood texture) may have superior cosmetic value. However, such building panels also previously had associated safety concerns as either the entire building panel would be made from wood, thereby increasing flammability concerns, thereby endangering individuals by further fueling a fire.

Previous attempts at imparting fire repellency involved applied flame retardant compositions to the major surfaces of the cellulosic materials. However, such previous attempts resulted in degradation of the aesthetic value of the cellulosic substrate due to the flame retardant compositions interfering with the appearance of the resulting building product. Additionally, substantial difficulties existed with respect to proper adhesion of and moisture degradation of such flame retardant compositions. Thus, there is a need for building panels that can be formed from natural materials and exhibit superior cosmetic value without degradation the natural aesthetic appearance imparted by such materials.

BRIEF SUMMARY

The present invention is directed to a barrier coating composition comprising: an organic blend comprising a first component and a second component, the first component comprising latex polymer and the second component being selected from polyurethane emulsion, wax emulsion, and alkyd emulsion; wherein the first component and the second component are present in a weight ratio ranging from about 2:1 to about 20:1, and the latex polymer having a glass transition temperature of less than about 18° C.

In other embodiments, the present invention is directed to a building panel having a water-impervious surface comprising a body having a first major surface opposite a second major surface; a barrier coating atop the first major surface of the body, the barrier coating comprising an organic blend comprising a first component and a second component, the first component comprising latex polymer and the second component being selected from polyurethane emulsion, wax emulsion, and an alkyd emulsion; wherein the barrier coating has a solids content of at least 99% based on the total weight of the barrier coating, and wherein the first component and the second component are present in a weight ratio ranging from about 2:1 to about 20:1, and the latex polymer having a glass transition temperature of less than about 18° C.

Other embodiments of the present invention include a method of forming a water-impervious coating comprising a) mixing an organic blend and a liquid carrier to form a barrier coating composition; b) applying the barrier coating composition to a major surface of a body; c) drying the coating composition to form a barrier coating having a solids content of at least 99% based on the total weight of the barrier coating, wherein the organic blend comprises a first component and a second component, the first component comprising latex polymer and the second component being selected from polyurethane emulsion, alkyd emulsion, and wax emulsion, and the first component and the second component are present in a weight ratio ranging from about 2:1 to about 20:1, and the latex polymer has a glass transition temperature of less than about 18° C.; and wherein the barrier coating is impervious to liquid water.

Other embodiments of the present invention include a barrier coating composition comprising: a blend of a medium chain-stopped oil alkyd emulsion and dry agent; an adhesion promoter; and wherein the chain-stopped oil alkyd emulsion and the adhesion promoter are present in a ratio ranging from about 20:1 to about 40:1.

Other embodiments of the present invention include a barrier coating composition comprising a blend of: an organic blend comprising a first component and a second component, the first component being different from the second component; a flame-retardant composition comprising a first flame retardant and a second flame retardant, the first flame retardant and the second flame retardant being different.

In some embodiments, the present invention is directed to a building panel having a flame-retardant surface comprising a body having a first major surface opposite a second major surface; a barrier coating atop the first major surface of the body, the barrier coating comprising: an organic blend composition; a first flame retardant composition comprising a first flame retardant and a second flame retardant, the first flame retardant and the second flame retardant being different; wherein the barrier coating is substantially transparent such that the first major surface of the body is visible through the barrier coating.

In other embodiments, the present invention includes a method of forming a water-impervious coating comprising a) mixing an organic blend, a flame-retardant composition, and a liquid carrier to form a barrier coating composition; b) applying the barrier coating composition to a major surface of a body; c) drying the coating composition to form a barrier coating having a solids content of at least 99% based on the total weight of the barrier coating, wherein the organic blend comprises a first component and a second component, the first and second components being different, the flame-retardant composition comprises a first flame retardant and a second flame retardant, the first flame retardant and the second flame retardant being different; and the liquid carrier comprises water; and wherein the barrier coating is impervious to liquid water.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
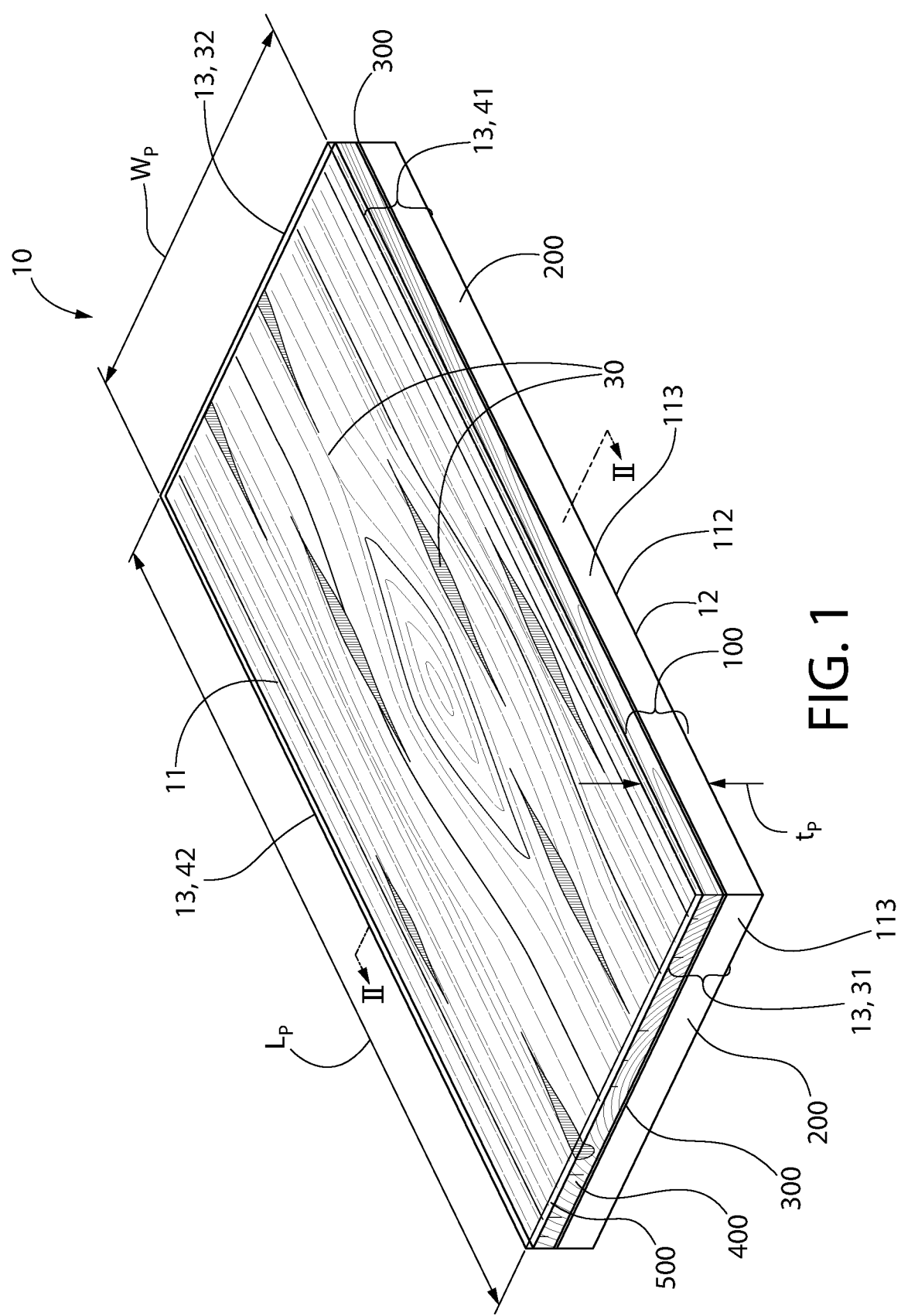
FIG. 1 is top perspective view of the building panel according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value. According to the present application, the term "substantially free" less than about 0.1 wt. % based on the total of the referenced value.

Figure 5:
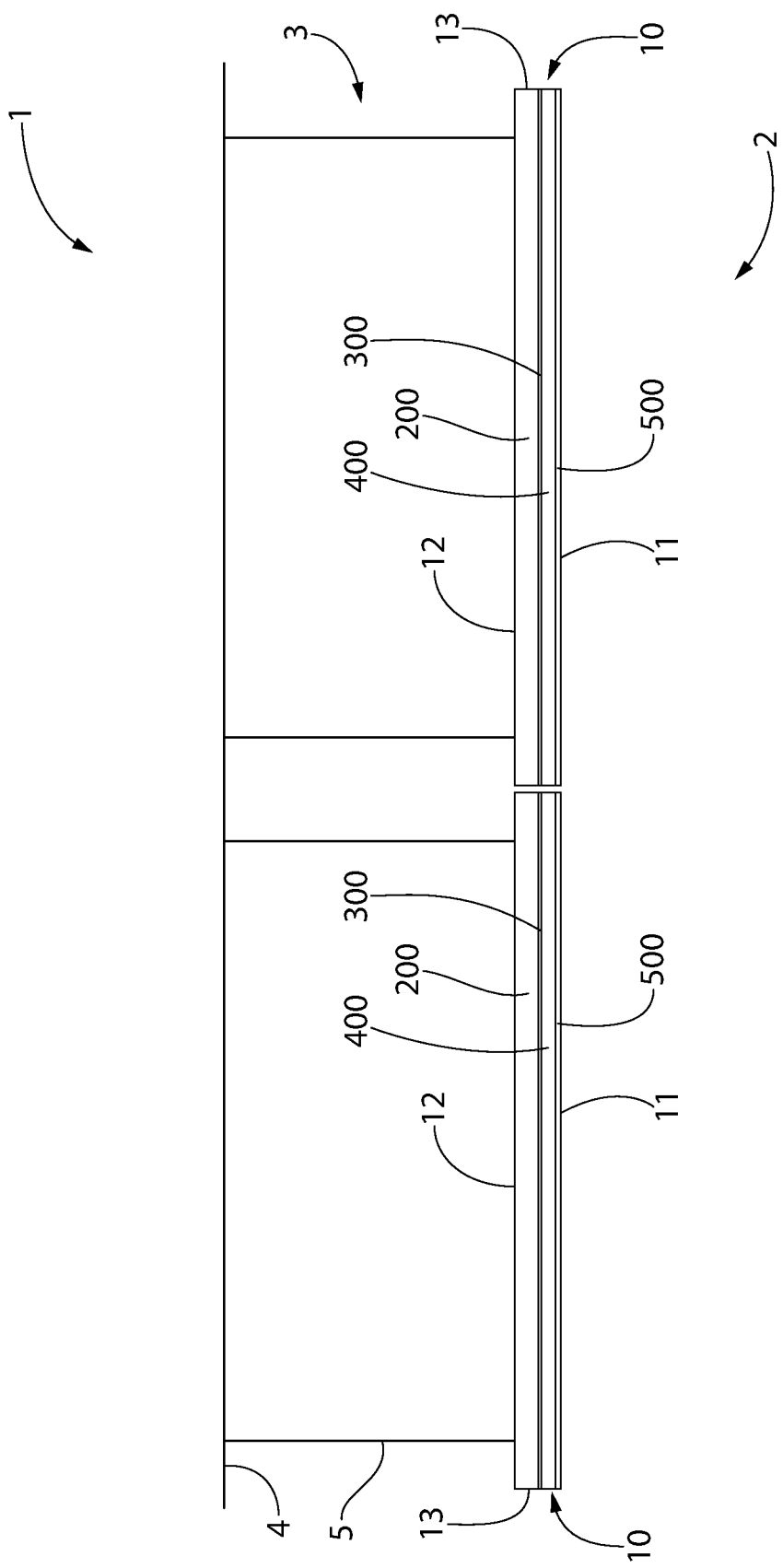
FIG. 5 is a ceiling system comprising the building panel of the present invention.

Referring to FIGS. 1 and 5, the present invention includes a ceiling system 1 as well as a building panel 10 that may be used in the ceiling system 1. The ceiling system 1 may comprise at least one or more of the building panels 10 installed in an interior space, whereby the interior space comprises a plenum space 3 and an active room environment 2. The plenum space 3 is defined by the space occupied between a structural barrier 4 between floors of a building and the lower major surface 12 of the building panel 10. The plenum space 3 provides space for mechanical lines within a building (e.g., HVAC, electrical lines, plumbing, telecommunications, etc.). The active space 2 is defined by the space occupied beneath the upper major surface 11 of the building panel 10 for one floor in the building. The active space 2 provides room for the building occupants during normal intended use of the building (e.g., in an office building, the active space would be occupied by offices containing computers, lamps, etc.).

Each of the building panels 10 may be supported in the interior space by one or more supports 5. Each of the building panels 10 are installed such that the upper major surface 11 of the building panel 10 faces the active room environment 2 and the lower major surface 12 of the building panel 10 faces the plenum space 3. The building panels 10 of the present invention have superior fire safety performance—particularly when a fire originates in the active room environment 2—without sacrificing the desired aesthetic appearance of the building panel 10, as discussed herein.

Referring to FIG. 1, the present invention is a building panel 10 having an upper major surface 11, a lower major surface 12 that is opposite the upper major surface 11, and major side surfaces 13 that extend from the upper major surface 11 to the lower major surface 12 to form a perimeter of the building panel 10. The major side surfaces 13 may comprise first and second longitudinal side surfaces 41, 42 extending substantially parallel to each other. The major side surfaces 13 may further comprise first and second transverse side surfaces 31, 32 extending substantially parallel to each other. The first and second longitudinal side surfaces 41, 42 may extend substantially orthogonal to the first and second transverse side surfaces 31, 32.

The building panel 10 may have a panel thickness "$t_P$" as measured from the upper major surface 11 to the lower major surface 12. The panel thickness $t_P$ may range from about 25 mils to about 3,000 mils—including all values and sub-ranges there-between. In some embodiments, the panel thickness $t_P$ may range from about 25 mils to about 600 mils—including all values and sub-ranges there-between. In some embodiments, the panel thickness $t_P$ may range from about 700 mils to about 2,000 mils—including all values and sub-ranges there-between.

The building panel 10 may have a panel length "$L_P$" as measured from the first transverse side surface 31 to the second transverse side surface 32—i.e., the distance along one of the first or second longitudinal side surfaces 41, 42.

The panel length $L_P$ may range from about 6 inches to about 100 inches—including all values and sub-ranges there-between. The building panel 10 may have a panel width "$W_P$" as measured from the first longitudinal side surface 41 to the second longitudinal side surface 42—i.e., the distance along one of the first or second transverse side surfaces 31, 32. The panel width $W_P$ may range from about 2 inches to about 60 inches—including all values and sub-ranges there-between. In some embodiments, the panel width $W_P$ may range from about 12 inches to about 60 inches—including all values and sub-ranges there-between.

The building panel 10 of the present invention comprises a body 100 having a coating 500 applied thereto. The body 100 may comprise a first major surface 111 opposite a second major surface 112 and a side surface 113 extending there-between. The body 100 may be formed from a cellulosic material (e.g., wood), metal, polymer, and combinations thereof. The body 100 may be formed from a single layer of material (also referred to as an integral structure) or the body 100 may have a laminate structure formed from at least two layers. As discussed in greater detail herein, the body 100 having a laminate structure may comprise one or more layers of a cellulosic layer 400, a substrate layer 200, and/or an adhesive layer 300. Although not pictured, the coating 500 of the present invention may be applied to a non-woven scrim. Non-limiting examples of non-woven scrim include fiberglass non-woven scrims. The non-woven scrim may form at least one of the first or second major surface 11, 12 of the building panel 10.

The building panel 10 may comprise a decorative pattern 30 that is visible from the upper major surface 11, the lower major surface 12, and/or the major side surface 13. The decorative pattern 30 may comprise a pattern formed from natural materials, such as cellulosic materials (e.g., wood grain, knots, burl, etc.) or a synthetic material such as a printed ink. The decorative pattern 30 may be a body decorative pattern that exists on one of the first major surface 111, second major surface 112, or side surface 113 of the body 100, whereby the body decorative pattern is visible through the coating 500.

Figure 2:
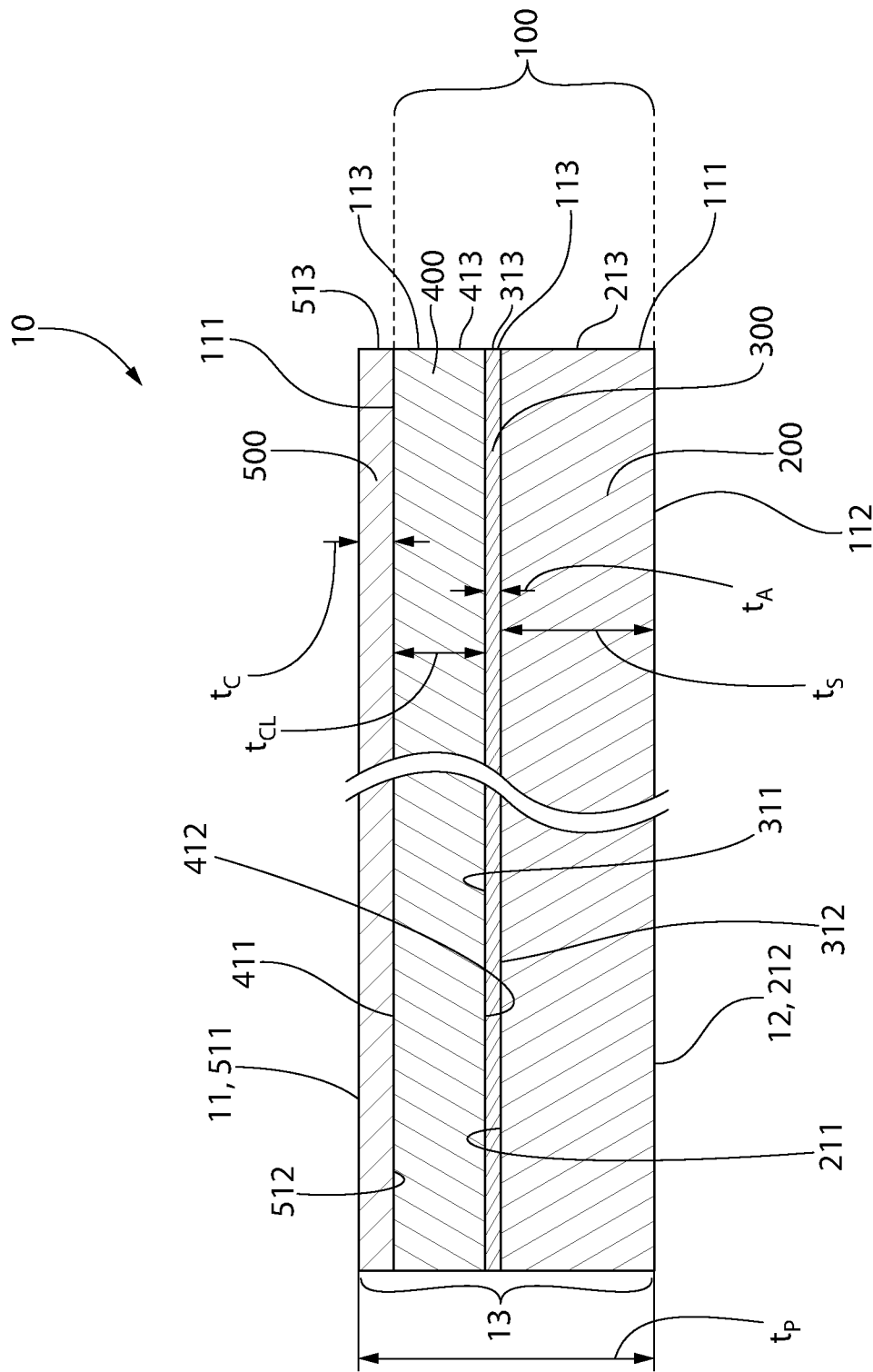
FIG. 2 is a cross-sectional view of the building panel according to the present invention, the cross-sectional view being along the II line set forth in FIG. 1.
Figure 6:
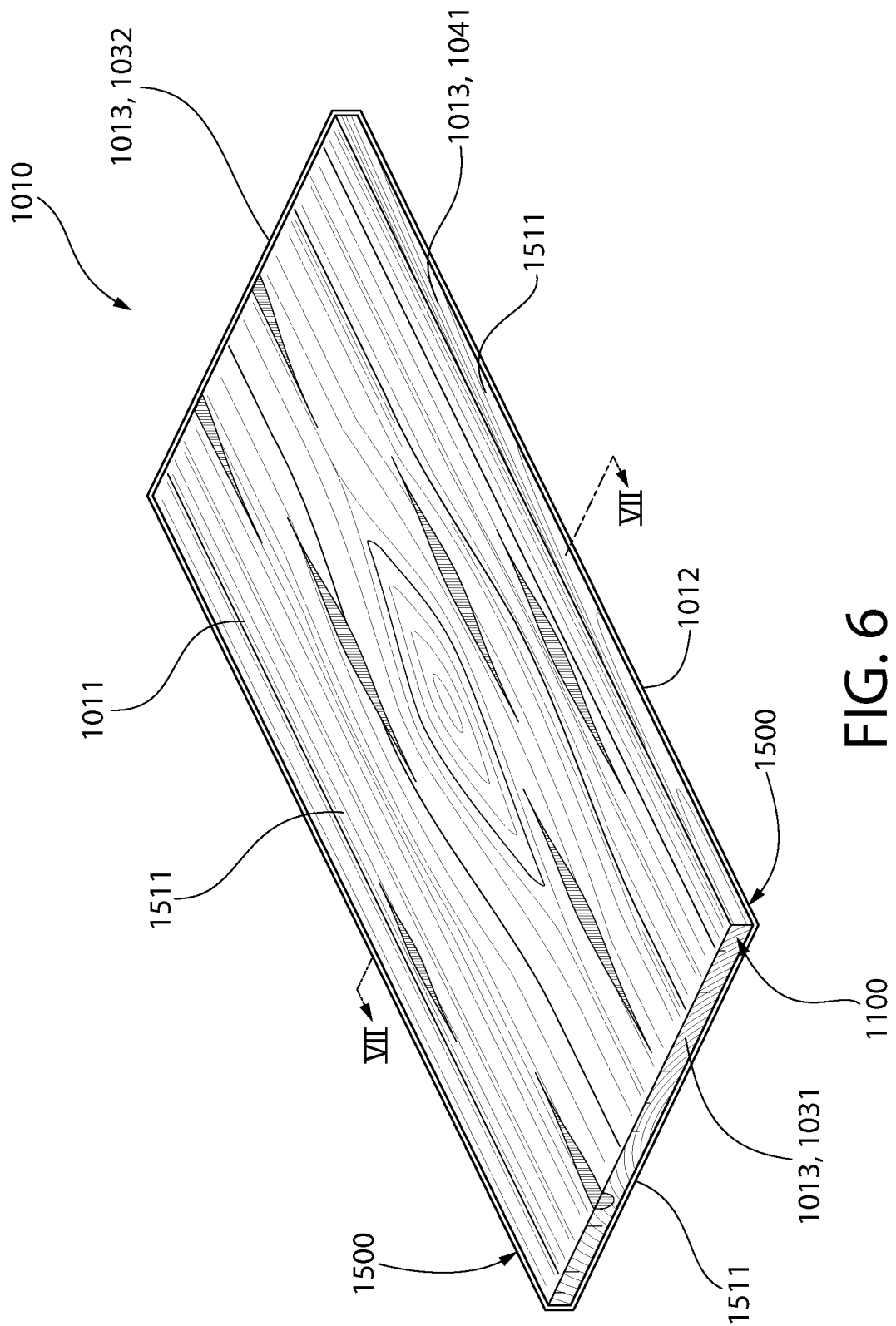
FIG. 6 is top perspective view of the building panel according to another embodiment of the present invention.
Figure 7:
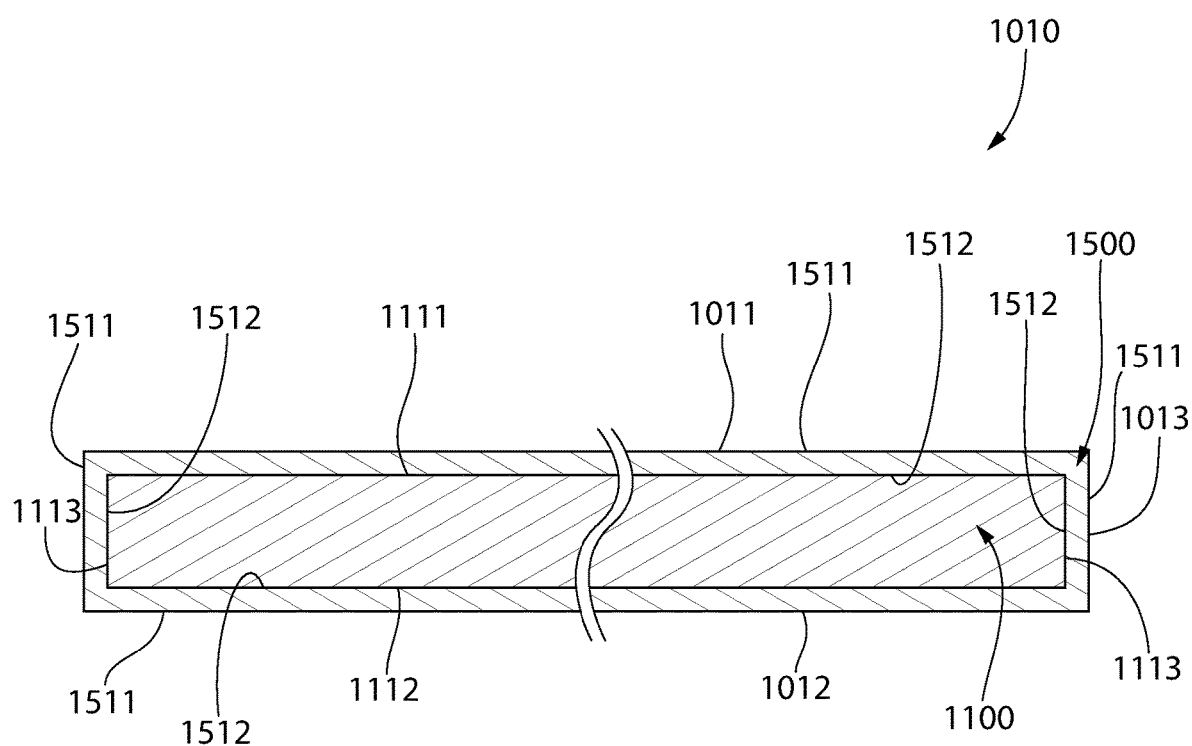
FIG. 7 is a cross-sectional view of the building panel according to the present invention, the cross-sectional view being along the VII line set forth in FIG. 6.

The coating 500 may be independently applied to each of the first major surface 111, the second major surface 112, and/or the side surface 113 of the body 100. In a preferred embodiment, the coating 500 is applied to the first major surface 111 of the body 100—as shown in FIG. 2. In another preferred embodiment, the coating 1500 may be applied to each of the first major surface 1111, the second major surface 1112, and the side surface 1113 of the body 1100 such that the coating 1500 encapsulates the body 100—as shown in FIGS. 6 and 7.

The coating 500 may be clear or substantially clear. For the purposes of this application, the phrases "substantially clear" or "substantially transparent" refers to materials that have the property of transmitting light in such a way that a normal, human eye (i.e., one belonging to a person with so-called "20/20" vision) or a suitable viewing device can see through the material distinctly. The level of transparency should generally be one which permits a normal, human eye to distinguish objects having length and width on the order of at least 0.5 inches, and should not significantly distort the perceived color of the original object. The coating 500 should be substantially clear (or substantially transparent) such that the underlying body decorative feature can be visible from the upper major surface 11 of the building panel 10 as the decorative pattern 30 on the overall building panel 10, as discussed further herein. The term "substantially clear" or "substantially transparent" may also refer to the coating having at least 70% optical clarity, whereby 100% optical clarity refers to an underlying surface being completely unhindered visually by the coating 500.

Referring now to FIG. 2, the coating 500 may comprises an upper coating surface 511 opposite a lower coating surface 512. The coating 500 may comprise a coating side surface 513 that extends from the upper coating surface 511 to the lower coating surface 512 and forms a perimeter of the coating 500. The coating side surface 513 may form a portion of the major side surface 13 of the building panel 10. Stated otherwise, the major side surface 13 of the building panel 10 may comprise the coating side surface 513. The coating 500 may have a coating thickness "$t_C$" ranging from about 0.5 mils to about 3.0 mils—including all values and sub-ranges there-between—as measured from the upper coating surface 511 to the lower coating surface 512.

The coating 500 may comprise an inorganic composition that is substantially clear. According to the present invention, the phrase "inorganic composition" refers to a dry-state composition having less than 3 wt. % of organic compounds present based on the total dry-weight of the referenced inorganic composition, preferably less than 1.5 wt. % of organic compounds present based on the total dry-weight of the referenced inorganic composition. According to the present invention, the phrase "inorganic composition" may also refer to a wet-state composition that has less than 5.0 wt. % of organic compounds present based on the total wet-weight of the referenced inorganic composition, preferably less than 3.0 wt. % of organic compounds present based on the total wet-weight of the referenced inorganic composition.

The phrase "dry-weight" refers to the weight of a referenced component or composition without the weight of any carrier. Thus, when calculating the amounts of components based on dry-weight, the calculation are to be based solely on the solid components (e.g., binder, filler, hydrophobic component, fibers, etc.) and should exclude any amount of residual carrier (e.g., water, VOC solvent) that may still be present from a wet-state, which will be discussed further herein. Additionally, according to the present invention, the phrase "dry-state" refers to a component or composition that is substantially free of carrier, as compared to the phrase "wet-state," which refers to that component still containing various amounts of carrier. The term "weight-state" refers to a component or composition that further comprises a carrier. Similarly, the phrase "wet-weight" refers to a total weight of component or composition that includes the weight of the carrier when in the wet-state.

The inorganic composition may be referred to as a flame retardant composition or a glass-forming composition. When exposed to high-heat (e.g., during a fire), the inorganic composition is capable of creating a strong insulative barrier between the body 100 and high heat originating from a fire. The inorganic composition of the present invention exhibits a high pH that ranges from about 9 to about 13—including all pHs and sub-ranges there-between. In a preferred embodiment, the pH ranges from about 10 to less than about 13—including all pHs and sub-ranges there-between. In a preferred embodiment, the pH is about 12.

The inorganic composition may comprise a silicate compound. Non-limiting examples of the silicate compound may include potassium silicate, tetraethyl orthosilicate, and combinations thereof.

The silicate compound may be present in an amount ranging from about 50 wt. % to about 98 wt. %—including all wt. % and sub-ranges there-between—based on the total weight of the inorganic composition in the dry-state. In a preferred embodiment, the silicate compound may be present in an amount ranging from about 70 wt. % to about 90 wt. %—including all wt. % and sub-ranges there-between—based on the total weight of the inorganic composition in the dry-state.

The inorganic composition may further comprise alumina trihydrate. The alumina trihydrate may be present in an amount ranging from about 0.5 wt. % to about 12.5 wt. %—including all wt. % and sub-ranges there-between—based on the total weight of the inorganic composition in the dry-state. Additionally, compositions of the present invention may comprise a hydrate compound (e.g., alumina trihydrate), but that alone will not render that composition in a wet-state. Rather, the presence of water must be in a non-hydrate form (i.e., not bound in a crystalline matrix). A non-limiting example of composition being in the wet-state is the inorganic composition of the present invention further comprises aqueous water—i.e., water acts as a solvent whereby the inorganic composition may be the solute.

Upon exposure to elevated temperatures, the silicate compounds react to form a silicate glass layer (also referred to as the "glass layer"). The glass layer forms a hard protective and heat-insulative barrier that is especially helpful in preventing the body 100 from igniting at elevated temperatures, for example when the body 100 is formed from a cellulosic material as discussed further herein. The heat-insulative barrier formed by the coating 500 is especially useful when the upper major surface 11, lower major surface 12, and/or side surface 13 of the building panel 10 is exposed to heat from a fire that exists in the active room environment 2 of the ceiling system 1 (as shown in FIG. 5). The heat-insulative barrier created by the inorganic composition slows and prevents further propagation of heat and flame through the coating 500 and, therefore, through the rest of the body 100 of the building panel 10.

At such elevated temperature, the hydrate present in the alumina trihydrate may be released and create a gaseous expansion within the glass layer. The gaseous expansion may cause the glass layer to lift away from the major surface 111, 112, 113 of the body 100, thereby further separating the underlying body 100 from the high-heat in the surrounding environment, thereby further protecting the body 100 from damage during a fire.

The glass-forming composition may also comprise a first glass component and a second glass component that together react to form an inorganic glass-like surface when exposed to elevated temperatures—such as elevated temperatures during a fire. The inorganic composition of the present invention exhibits a pH ranging from about 1.5 to about 5—including all pHs and sub-ranges there-between. In a preferred embodiment, the pH ranges from about 1.7 to about 4—including all pHs and sub-ranges there-between. In a preferred embodiment, the pH is less than about 3.

The first glass component comprises a phosphate compound. The second glass component comprises a borate compound. The first glass component and the second glass component may be present in a weight ratio ranging from about 5:1 to about 80:1—including all ratios and sub-ranges there-between.

The first glass component may be present in an amount ranging from about 40.0 wt. % to about 80.0 wt. %—including all wt. % and sub-ranges there-between—based on the total weight of the inorganic composition in the dry-state. In a preferred embodiment, the first glass component may be present in an amount ranging from about 55.0 wt. % to about 75.0 wt. %—including all wt. % and sub-ranges there-between—based on the total weight of the inorganic composition in the dry-state. The second glass component may be present in an amount ranging from about 0.5 wt. % to about 15.0 wt. %—including all wt. % and sub-ranges there-between—based on the total weight of the inorganic composition in the dry-state. In a preferred embodiment, the second glass component may be present in an amount ranging from about 1.0 wt. % to about 10.5 wt. %—including all wt. % and sub-ranges there-between—based on the total weight of the inorganic composition in the dry-state.

Non-limiting examples of the phosphate compound of the first glass component include phosphoric acid ($H_3PO_4$), pyrophosphoric acid ($H_4P_2O_7$), polyphosphoric acid, sodium phosphate, potassium phosphate, aluminum tris (di-hydrogen phosphate), other phosphate-ion forming compounds, and combinations thereof. Non-limiting examples of the borate compound of the second glass component include boron trioxide ($B_2O_3$), zinc borate, and other soluble borate forming compound at pH between 1 and 5, and combinations thereof. Several variants of zinc borate exist and include Zinc borate Firebrake ZB ($2ZnO.3 B_2O_3.3.5H_2O$), Zinc borate Firebrake 500 ($2ZnO.3 B_2O_3$), Zinc borate Firebrake 415 ($4ZnO.B_2O_3.H_2O$), ZB-467 ($4ZnO.6B_2O_3.7H_2O$), and ZB-223 ($2ZnO.2B_2O_3.3H_2O$). According to some embodiments the zinc borate may also serve as a fungicide.

Upon exposure to elevated temperatures, the first and second glass compositions react to form a phosphoborate glass layer (also referred to as the "glass layer"). The glass layer forms a hard protective and heat-insulative barrier that is especially helpful in preventing the body 100 from igniting at elevated temperatures, for example when the body 100 is formed from a cellulosic material as discussed further herein. The heat-insulative barrier formed by the coating 500 is especially useful when the upper major surface 11, lower major surface 12, and/or side surface 13 of the building panel 10 is exposed to heat from a fire that exists in the active room environment 2 of the ceiling system 1 (as shown in FIG. 5). The heat-insulative barrier created by the inorganic composition slows and prevents further propagation of heat and flame through the coating 500 and, therefore, through the rest of the body 100 of the building panel 10.

The inorganic composition may optionally comprise other additives or fillers such as, but not limited to fire retarding compounds (also referred to as "flame retardant"), adhesion promoters, char-forming additives, viscosity modifying agents, dispersants, waxes, latex polymer, wetting agents, catalyst, cross-linkers, oxidizers, ultra-violet stabilizers.

The adhesion promoters may be a silane having generally have the formula (I)

$$R^1_n Si(OR^2)_{4-n} \quad (1)$$

a wherein $R^1$ represents a lower alkyl group, a phenyl group or a functional group containing at least one of vinyl, acrylic, amino, epoxide, mercapto, or vinyl chloride functional groups; $R^2$ is a C1 to C6 alkyl group; and n is a number of 1 to 2.

According to other embodiments, where $R^1$ is alkyl, preferably, a $C_1$-$C_6$alkyl group (the group may be a straight, cyclic, or branched-chain alkyl), such as methyl, ethyl, n- or iso-propyl, n- or iso-butyl, n-pentyl, cyclohexyl, and the like, preferably a $C_1$-$C_4$ alkyl group, most preferably a methyl, ethyl, propyl or butyl group), aryl, such as a phenyl, or a functional group or groups, such as vinyl, acrylic, methacrylic, amino, mercapto, or vinyl chloride functional group, e.g., 3,3,3-trifluoropropyl, γ-glycidyloxypropyl, γmethacryloxypropyl, N-(2-aminoethyl)-3-aminopropyl, aminopropyl, and the like; and each $R^2$ is, independently, an alkyl group (i.e. a $C_1$-$C_6$ straight or branched chain alkyl group, preferably a $C_1$-$C_4$ alkyl group, such as a methyl group).

In a non-limiting embodiment, the $R^1$ may be an epoxide group, whereby the epoxy-functional silane-functional adhesion promoter may have the formula (II):

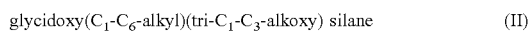
$$\text{glycidoxy}(C_1\text{-}C_6\text{-alkyl})(\text{tri-}C_1\text{-}C_3\text{-alkoxy}) \text{ silane} \qquad (II)$$

In some embodiments, the compound of formula (II) may include compounds such as, 3-glycidoxypropyltrimethoxysilane, 3-glycidoxypropyldiisopropylethoxysilane, (3-glycidoxypropyl)methyldiethoxysilane, 3-glycidoxypropyltriethoxysilane, and epoxy-functional silane compounds represented by the formula (IV))

wherein $R^{10}$, $R^{20}$ and $R^{30}$, independently, represent aliphatic or aromatic groups, especially, lower alkyl of from 1 to 6 carbon atoms, preferably $C_1$-$C_3$ alkyl, and 'EP' represents glycidyl (e.g., glycidyloxy), cyclohexane oxide (epoxycyclohexyl) or cyclopentane-oxide (epoxycyclopentyl); and n is a number of from 1 to 4, preferably 1, 2 or 3.

As examples of the epoxy functional compounds represented by formula (IV), mention may be made of, for example, gamma-glycidyloxymethyltrimethoxysilane, gamma-glycidyloxymethyltriethoxysilane, gamma-glycidoxymethyl-tripropoxysilane, gamma-glycidoxymethyltributoxysilane, beta-glycidoxyethyltrimethoxysilane, beta-glycidoxyethyltriethoxysilane, beta-glycidoxyethyl-tripropoxysilane, beta-glycidoxyethyl-tributoxysilane, beta-glycidoxyethyltrimethoxysilane, alpha-glycidoxyethyl-triethoxysilane, alpha-glycidoxyethyl-tripropoxysilane, alpha-glycidoxyethyltributoxysilane, gamma-glycidoxypropyl-trimethoxy silane, gamma-glycidoxypropyl-triethoxysilane, gamma-glycidoxypropyl-tripropoxysilane, gamma-glycidoxypropyltributoxysilane, beta-glycidoxypropyl-trimethoxysilane, beta-glycidoxypropyl-triethoxysilane, beta-glycidoxypropyl-tripropoxysilane, beta-glycidoxypropyl-tributoxysilane, alpha-glycidoxypropyl-trimethoxysilane, alpha-glycidoxypropyl-triethoxysilane, alpha-glycidoxypropyl-tripropoxysilane, alpha-glycidoxypropyl-tributoxysilane, gamma-glycidoxybutyl-trimethoxysilane, delta-glycidoxybutyl-triethoxysilane, delta-glycidoxybutyl-tripropoxysilane, delta-glycidoxybutyl-tributoxysilane, delta-glycidoxybutyl-trimethoxysilane, gamma-glycidoxybutyl-triethoxysilane, gamma-glycidoxybutyl-tripropoxysilane, gamma-alpropoxybutyl-tributoxysilane, delta-glycidoxybutyl-trimethoxysilane, delta-glycidoxybutyl-triethoxysilane, delta-glycidoxybutyl-tripropoxysilane, alpha-glycidoxybutyl-trimethoxysilane, alpha-glycidoxybutyl-triethoxy silane, alpha-glycidoxybutyl-tripropoxysilane, alpha-glycidoxybutyl-tributoxysilane, (3,4-epoxycyclohexyl)-methyl-tri methoxysilane, (3,4-epoxycyclohexyl) methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-trimethoxy silane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexyl)butyl-triethoxysilane, (3,4-epoxycyclohexyl)butyl-tripropoxysilane, (3,4-epoxycyclohexyl)butyl-tributoxysilane.

As examples of silanes of formula (I), wherein $R^1$ is an alkyl group or aryl group, and n is 1, mention may be made of, for example, methyltrimethoxysilane, ethyltrimethoxysilane, ethyltriethoxysilane, n-propyltrimethoxysilane, n-propyltriethoxysilane, isopropyltrimethoxysilane, n-butyltrimethoxysilane, isobutyltrimethoxysilane, phenyltrimethoxysilane, preferably Methyltrimethoxysilane, phenyltrimethoxysilane, and mixtures thereof.

In a non-limiting embodiment, the $R^1$ may be an amino group, whereby the amine-functional silane-functional adhesion promoter may be selected from one or more of aminoethyl-triethoxysilane, beta-amino-eythyltirmethoxysilane, beta-aminoethyl-beta-aminoethyl-triethoxysilane, beta-amino-ethyl-tributoxysilane, beta-aminoethyl-tripropoxysilane, alpha-aminoethyl-trimethoxysilane, alpha-aminoethyl-triethoxysilane, gamma-aminopropyltrimethoxysilane, gamma-aminopropyl-triethoxysilane, gamma-aminopropyl-tributoxysilane, gamma-aminopropyltripropoxysilane, beta-aminopropyl-trimethoxysilane, beta-aminopropyl-triethoxysilane, beta-amino-propyltripropoxysilane, beta-aminopropyl-tributoxysilane, alpha-aminopropyl-trimethoxysilane, alpha-aminopropyltriethoxysilane, alpha-aminopropyl-tributoxysilane, alpha-aminopropyl-tripropoxysilane, N-aminomethylaminoethyl-trimethoxysilane, N-aminoethylaminomethyl-tripropoxysilane, N-aminomethyl-beta-aminoethyl-trimethoxysilane, N-aminomethyl-beta-aminoethyl-triethoxysilane, N-aminomethyl-beta-aminoethyl-tripropoxysilane, N-aminomethyl-gamma-aminopropyl-trimethoxysilane, N-aminomethyl-gamma-aminopropyl-triethoxysilane, N-aminomethyl-gamma-aminopropyl-tripropoxysilane, N-aminomethyl-beta-aminopropyl-trimethoxysilane, N-aminomethyl-beta-aminopropyl-triethoxysilane, N-aminomethyl-beta-aminopropyl-tripropoxysilane, N-aminomethylpyltripropoxysilane, N-aminopropyl-trimethoxysilane, N-(beta-aminoethyl)-beta-aminoethyl-trimethoxysilane, N-(beta-aminoethyl)-beta-aminoethyl-triethoxy silane, N-(beta-aminoethyl)-beta-aminoethyl-tripropoxysilane, N-(beta-aminoethyl)-beta-aminoethyl-trimethoxysilane, N-(beta-aminoethyl)-alpha-aminoethyl-triethoxysilane, N-(beta-aminoethyl)-alpha-aminoethyl-tripropoxysilane, N-(beta-aminoethyl)-beta-aminopropyl-trimethoxysilane, N-(beta-aminoethyl)-gamma-aminopropyl-triethoxysilane, N-(beta-aminoethyl)-gamma-aminopropyl-tripropoxysilane, N-(beta-aminoethyl)-gamma-aminopropyl-trimethoxysilane, N-(beta-aminoethyl)-beta-aminopropyl-triethoxysilane, N-(beta-aminoethyl)-beta-aminopropyl-tripropoxysilane, N-(gamma-aminopropyl)-beta-aminoethyl-trimethoxysilane, N-(gamma-aminopropyl)-beta-aminoethyl-triethoxysilane, N-(gamma-aminopropyl)-beta-aminoethyl-tripropoxysilane, N-methyl aminopropyl trimethoxysilane, beta-aminopropyl methyl diethoxysilane, gamma-diethylene triaminepropyltriethoxysilane, and the like.

The oxidizers may be present in the inorganic coating in an amount ranging from about 0.1 wt. % to about 2 wt. %—based on the total dry weight of the inorganic coating—including all amounts and sub-ranges there-between. Non-limiting examples of oxidizers include peroxide, hydrogen peroxide, and the like, as well as combinations thereof.

In some embodiments, the inorganic coating composition may comprise a chelation forming agent that are capable of reacting with tannins present in cellulosic materials present in the cellulosic layer 300. The reaction between the chelation forming agent and the tannin form a chelation compound comprising a metal ion and ligands formed from the tannin. By capturing the tannin in the chelation compound, the tannin is prevented from creating a yellowing effect in the resulting coating. Non-limiting examples of chelation forming agent is zinc oxide, aluminum zirconium, and combinations thereof. In a preferred embodiment, the chelation forming agent is zinc oxide. The chelation forming agent may be present in the inorganic coating in an amount ranging from about 0.1 wt. % to about 2 wt. %—based on the total dry weight of the inorganic coating—including all amounts and sub-ranges there-between.

According to some embodiments, the inorganic composition may further comprise organic compounds so long as the overall inorganic composition includes less than 5 wt. % of organic compounds in the overall inorganic composition. According to some embodiments, the inorganic composition may be substantially free of blowing-agent. The wetting agent may be present in a non-zero amount that is less than about 0.1 wt. %—based on the total dry-weight of the inorganic composition.

The filler may be present in the inorganic coating in an amount ranging from about 15 wt. % to about 75 wt. %—including all amounts and sub-range there-between—based on the total dry weight of the inorganic coating. Non-limiting examples of filler may include calcium carbonate ($CaCO_3$), aluminum carbonate ($Al_2(CO_3)_3$), lithium carbonate ($LiCO_3$), magnesium carbonate ($MgCO_3$), fumed silica, aluminum oxide ($Al_2O_3$), and combinations thereof.

The flame retardants may be present in the coating 500 in an amount ranging from about 0 wt. % to about 50 wt. %—including all values and sub-ranges there-between—based on the total weight of the coating 500. Non-limiting examples of flame retardant may include ammonium hydroxide, aluminum trihydrate, magnesium hydroxide, huntite, hydromagnesite, silica, polyphosphate, chloride salts—such as sodium chloride, antimony oxide, and borates, such as calcium borate, calcium borosilicate, magnesium borate, zinc borate, and combinations thereof.

According to the present invention, it has been surprisingly discovered that superior flame retardancy can be achieved when combining two or more different flame retardants. In a non-limiting example, a blend of alumina trihydrate and calcium borosilicate imparts a superior flame retardancy compared to only alumina trihydrate or calcium borosilicate for the same loading amount of overall flame retardant in the coating of the present invention. In another non-limiting example, a blend of alumina trihydrate and zinc borate imparts a superior flame retardancy compared to only alumina trihydrate or zinc borate for the same loading amount of overall flame retardant in the coating of the present invention.

The coating composition of the present invention may comprise a first flame retardant and a second flame retardant, whereby the first and second flame retardants are different, and a ratio of the first flame retardant to second flame retardant ranges from about 1:3 to about 3:1—including all ratios and sub-ranged there-between. In some embodiments, the ratio of the first flame retardant to second flame retardant may range from about 1:2 to about 2:1—including all ratios and sub-ranged there-between. In some embodiments, the ratio of the first flame retardant to second flame retardant ranges from about 1:1.5 to about 1.5:1—including all ratios and sub-ranged there-between—preferably about 1:1.

The blend of first and second flame retardant may be present in an amount ranging from about 1 wt. % to about 30 wt. %—based on the total weight of the coating composition—including all amounts and sub-ranges there-between. The blend of first and second flame retardant may be present in an amount ranging from about 5 wt. % to about 20 wt. %—based on the total weight of the coating composition—including all amounts and sub-ranges there-between. The blend of first and second flame retardant may be present in an amount ranging from about 10 wt. % to about 20 wt. %—based on the total weight of the coating composition—including all amounts and sub-ranges there-between.

The dispersant may be ionic or non-ionic. Non-limiting examples of ionic dispersant includes sodium polyacrylate. Non-limiting examples of non-ionic dispersant include propoxylated ethoxylated linear alcohol, ethoxylated nonylphenols, ethoxylated alcohols, ethoxylated castor oil, polyethylene glycol fatty acid esters, and ethyleneglycol-propyleneglycol copolymers. The dispersant may be present in the inorganic composition in an amount that ranges from a non-zero amount to less than 1 wt. % based on the total dry-weight of the inorganic composition. In a preferred embodiment, the dispersant is preset in an amount ranging from a non-zero amount to less than 0.5 wt. % based on the total dry-weight of the inorganic composition.

Figure 3:
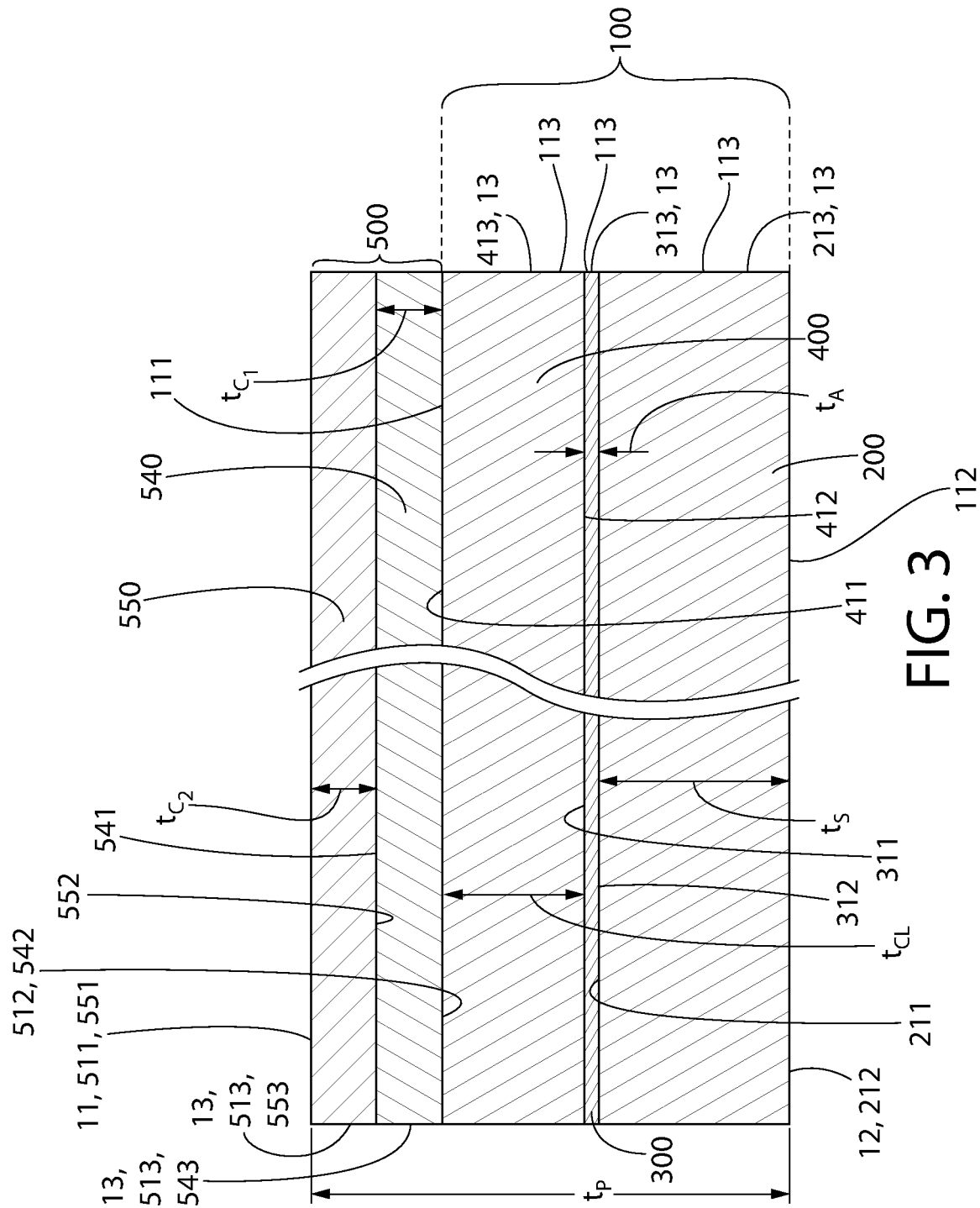
FIG. 3 is cross-sectional view of a building panel according to other embodiments of the present invention, the cross-sectional view being along the II line set forth in FIG. 1.
Figure 4:
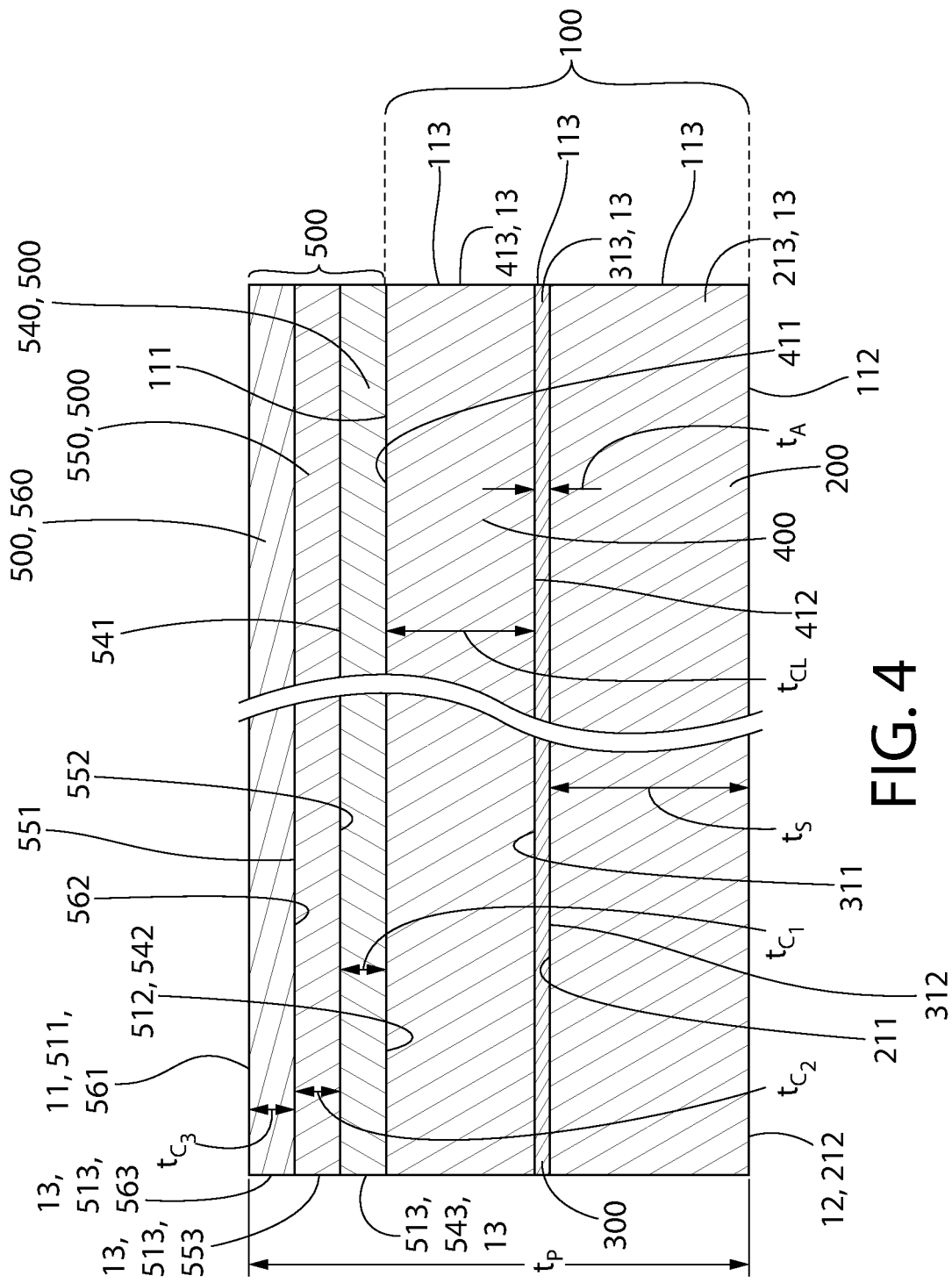
FIG. 4 is cross-sectional view of a building panel according to other embodiments of the present invention, the cross-sectional view being along the II line set forth in FIG. 1.

According to the present invention, the coating 500 may be comprised of a single integral layer (FIG. 2) or a plurality of sub-layers 540, 550, 560 (FIGS. 3 and 4). The coating 500 show in FIG. 2 having a single integral layer comprises the inorganic composition of the present invention.

Referring now to FIG. 3, the coating 500 of the present invention may comprise may comprise a first sub-layer 540 and a second sub-layer 550, whereby the first sub-layer 540 is directly atop one or more of the first major surface 111, second major surface 112, and/or side surface 113 of the body 100. The second sub-layer 550 may be directly atop the first sub-layer 540. The second sub-layer 550 comprises the inorganic composition of the present invention. In such embodiments, the inorganic composition may be present in an amount ranging from about 95 wt. % to about 100 wt. %—including all values and sub-ranges there-between—based on the total dry-weight of the second sub-layer 550.

Referring now to FIG. 4, the coating 500 of the present invention may comprise may comprise a first sub-layer 540, a second sub-layer 550, and a third sub-layer 560, whereby the first sub-layer 540 is directly atop one or more of the first major surface 111, second major surface 112, and/or side surface 113 of the body 100. The second sub-layer 550 may be directly atop the first sub-layer 540, and the third sub-layer 560 may be directly atop the second sub-layer 550. The second sub-layer 550 may comprise the inorganic composition of the present invention. In such embodiments, the inorganic composition may be present in an amount ranging from about 90 wt. % to about 100 wt. %—including all values and sub-ranges there-between—based on the total dry-weight of the second sub-layer 550.

According to the present invention, the first sub-layer 540 may also be referred to as a "base coating." The first sub-layer 540 may be present in an amount ranging from about 50 g/m$^2$ to about 80 g/m$^2$—including all amounts and sub-ranges there-between—based on the total dry-weight of the first sub-layer 540.

The first sub-layer 540 is an inorganic coating may comprise a first silicate compound, which is selected from the silicate compounds previously discussed. The first silicate compound may be present in the first sub-layer in an amount ranging from about 50 wt. % to about 98 wt. %—including all amounts and sub-ranges there-between—based on the total dry weight of the first sub-layer 540. The first sub-layer 540 may be substantially clear. The first sub-layer 540 may comprise alumina trihydrate in an amount ranging from about 0.5 wt. % to about 5.5 wt. %—including all wt. % and sub-ranges there-between—based on the total weight of the first sub-layer 540 in the dry-state.

According to the present invention, the phrase "inorganic coating" refers to the coating having less than 5 wt. % of organic compounds present based on the total dry weight of the referenced inorganic coating, preferably less than 3 wt. % of organic compounds present based on the total weight of the referenced inorganic coating in the dry-state. According to some embodiments, the inorganic coating of the second sub-layer 550 may be formed entirely from the inorganic composition of the present invention.

Although the first sub-layer 540 is an inorganic coating, it may comprise a first organic component in an amount up to about 3 wt. % based on the total weight of the first sub-layer. The first organic component of the first sub-layer 540 may comprise one or more dispersant.

In other embodiments the first sub-layer 540 may be formed from a sealant polymer—whereby no silicates are present in the first sub-layer 540. Non-limiting examples of such sealant polymer include polyurethane, latex polymer, as well as commercially available wood sealers or one of the other polymer binders listed herein. According to the embodiments where the first sub-layer 540 comprises a sealant polymer, the first sub-layer 540 may be present in a dry-weight ranging from about 0.5 g/ft$^2$ to about 4.0 g/ft$^2$—including all amounts and sub-ranges there-between.

The second sub-layer 550 may be an inorganic coating that comprises a second silicate compound selected from the silicate compounds previously discussed. The second sub-layer 550 may be referred to as an "intermediate coat." The second sub-layer 540 may be present in an amount ranging from about 35 g/m$^2$ to about 65 g/m$^2$—including all amounts and sub-ranges there-between—based on the total dry-weight of the second sub-layer 550.

The second silicate compound may be present in the second sub-layer 550 in an amount ranging from about 50 wt. % to about 98 wt. %—including all amounts and sub-ranges there-between—based on the total dry weight of the second sub-layer 540. The second silicate compound may be the same as the second silicate compound. In other embodiments, the second silicate compound may be different than the second silicate compound. The second sub-layer 550 may be substantially clear and/or optically transparent. The second sub-layer 550 may comprise alumina trihydrate in an amount ranging from about 0.5 wt. % to about 5.5 wt. %—including all wt. % and sub-ranges there-between—based on the total weight of the second sub-layer 550 in the dry-state.

The second sub-layer 550 may further comprise one or more of the aforementioned silane adhesion promoters. The silane adhesion promoter may be present in an amount ranging from about 3 wt. % to about 15 wt. % based on the total weight of the second sub-layer 550—including all amounts and sub-ranges there-between. In one embodiment, the silane adhesion promoter of the second sub-layer 550 may be amine-functional.

Although the second sub-layer 550 is an inorganic coating, it may comprise a second organic component in an amount up to about 3 wt. % based on the total weight of the second sub-layer 550. The second organic component may comprise one or more of the dispersants, as previously discussed. The second organic component may also comprise a wax, a wax blend, a wax emulsion, and combinations thereof in an amount ranging from about wt. % to about 1 wt. % to about 10 wt. %—including all values and sub-ranges there-between—based on the total dry-weight of the second sub-layer 550.

Non-limiting examples of the wax (as well as wax emulsion) of the second sub-layer 550 may include a petroleum paraffin wax, a natural wax, or a synthetic wax such as polyethylene wax or oxidized polyethylene wax, or their mixtures. The wax can be, for example, a slack wax having a melting point of 40-80° C., optionally having a melting point of 45-65° C. The wax may be present in the amount ranging from about of 4 wt. % to about 7 wt. % based on the total dry-weight of the second sub-layer 550—including all amounts and sub-ranges there-between.

Referring now to FIG. 4, other embodiments provide that the coating 500 may further comprise a third sub-layer 560 atop the second sub-layer 550, which is atop the first sub-layer 540 that is atop the body 100. The third sub-layer 560 may be referred to as a "topcoat." The third sub-layer 560 may be an organic coating. In one embodiment, the silane adhesion promoter of the third sub-layer 560 may be epoxide-functional.

The third sub-layer 560 may comprise a blend of components capable for forming a topcoat layer atop the underlying body 100. The third sub-layer 560 may be formed from a moisture barrier composition that imparts moisture barrier properties to the resulting third sub-layer 560. The term "moisture barrier" refers to a composition that may be impervious to liquid water yet allows for water vapor to pass through the topcoat layer.

The third sub-layer 560 may be present in an amount ranging from about 10 g/m$^2$ to about 30 g/m$^2$—including all amounts and sub-ranges there-between—based on the total dry-weight of the third sub-layer 560. The third sub-layer 560 may further comprise various additives and fillers. The polymer binder may be present in an amount ranging from about 85 wt. % to about 99.9 wt. %—including all values and sub-ranges there-between—based on the total weight of the third sub-layer 560 in the dry-state.

According to the present invention, the components may be a binder, such as an organic binder. The binder may be selected from one or more of polymer binders. In other embodiments the component may be a chain-stopped oil alkyd emulsion, a wax emulsion, and an alkyd emulsion.

The third sub-layer 560 may further comprise one or more of the aforementioned silane adhesion promoters. The silane adhesion promoter may be present in an amount ranging from about 3 wt. % to about 15 wt. % based on the total weight of the third sub-layer 560—including all amounts and sub-ranges there-between.

The third sub-layer 560 may also comprise the aforementioned flame retardant. Specifically, the third sub-layer may comprise a first flame retardant and a second flame retardant, whereby the first and second flame retardants are different, and a ratio of the first flame retardant to second flame retardant ranges from about 1:3 to about 3:1—including all ratios and sub-ranged there-between. In some embodiments, the ratio of the first flame retardant to second flame retardant may range from about 1:2 to about 2:1—including all ratios and sub-ranged there-between. In some embodiments, the ratio of the first flame retardant to second flame retardant ranges from about 1:1.5 to about 1.5:1—including all ratios and sub-ranged there-between—preferably about 1:1.

The blend of first and second flame retardant may be present in an amount ranging from about 1 wt. % to about 30 wt. %—based on the total weight of the third sub-layer 560 composition—including all amounts and sub-ranges there-between. The blend of first and second flame retardant may be present in an amount ranging from about 5 wt. % to about 20 wt. %—based on the total weight of the third sub-layer 560—including all amounts and sub-ranges there-between. The blend of first and second flame retardant may be present in an amount ranging from about 10 wt. % to about 20 wt. %—based on the total weight of the third sub-layer 560—including all amounts and sub-ranges there-between.

In some embodiments, the organic blend may comprise a blend of a first component and a second component, whereby the first and second components are different. In a non-limiting embodiment, the first component may be a binder, such as a polymer binder. Non-limiting examples of polymer binder include latex polymer. In a non-limiting embodiment, the second component may be selected from polyurethane emulsion, wax emulsion, and alkyd emulsion. The first component and second component may be present in a weight ratio ranging from about 2.5:1 to about 10:1—including all ratios and sub-ranges there-between.

According to some embodiments, the organic binder may comprise a first component, a second component, and a third component, whereby the first, second, and third components are different. The first component may be a polymeric binder, such as a latex polymer. The second component may be polyurethane emulsion, and the third component may be a wax emulsion. The first component and second component may be present in a weight ratio ranging from about 2.5:1 to about 8:1—including all ratios and sub-ranges there-between. The first component and the third component may be present in a weight ratio ranging from 5:1 to about 10:1—including all ratios and sub-ranges there-between.

The polymer binder may comprise one or more vinyl or acrylic homopolymers or copolymers formed from ethylenically unsaturated monomers. According to the present invention the polymer binder may have a glass transition temperature that is less than about 18° C. The polymer binder may have a glass transition temperature that is less than about 17° C. The polymer binder may have a glass transition temperature that is less than about 16° C. The polymer binder may have a glass transition temperature that is less than about 15° C. The polymer binder may have a glass transition temperature that is less than about 14° C. The polymer binder may have a glass transition temperature that is less than about 13° C. The polymer binder may have a glass transition temperature that is less than about 12° C. The polymer binder may have a glass transition temperature that is less than about 11° C. The polymer binder may have a glass transition temperature that is about 10° C.

Non-limiting examples of monomers than may form the polymer binder include ethylene or butadiene and vinyl monomers such as styrene, vinyl esters such as vinyl acetate, vinyl propionate, vinyl butyrates, acrylic acid, methacrylic acid, or esters of acrylic acid and/or esters of methacrylic acid. The esters of acrylic or methacrylic acid may have an alkyl ester portion containing 1 to 12 carbon atoms as well as aromatic derivatives of acrylic and methacrylic acid, and can include, for example, acrylic and methacrylic acid, methyl acrylate and methyl methacrylate, ethyl acrylate and ethyl methacrylate, butyl acrylate and butyl methacrylate, propyl acrylate and propyl methacrylate, 2-ethyl hexyl acrylate and 2-ethyl hexyl methacrylate, cyclohexyl acrylate and cyclohexyl methacrylate, decyl acrylate and decyl methacrylate, isodecyl acrylate and isodecyl methacrylate, benzyl acrylate and benzyl methacrylate and various reaction products such as butyl, phenyl, and cresyl glycidyl ethers reacted with acrylic and methacrylic acids.

Specifically, the hydrophobic polymer may be a homopolymer or copolymer produced from ethylenically unsaturated monomers, such as styrene, alpha-methylstyrene, vinyl toluene, ethylene, propylene, vinyl acetate, vinyl chloride, vinylidene chloride, acrylonitrile, acrylamide, methacrylamide, acrylic acid, methacrylic acid, (meth)acryloxy-propionic acid, itaconic acid, aconitic acid, maleic acid, monomethyl maleate, monomethyl fumarate, monomethyl itaconate, various ($C_1$-$C_{20}$) alkyl or ($C_3$-$C_{20}$) alkenyl esters of (meth)acrylic acid and the like. The expression (meth)acrylic, as used herein, is intended to serve as a generic expression embracing both acrylic and methacrylic acid and esters thereof e.g., methyl (meth)acrylate, ethyl (meth)acrylate, butyl (meth)acrylate, isobutyl (meth)acrylate, 2-ethyl hexyl(meth)acrylate, benzyl (meth)acrylate, lauryl (meth)acrylate, oleyl (meth)acrylate, palmityl (meth)acrylate, stearyl (meth)acrylate and the like. In other embodiments, the hydrophobic polymeric binder may include polymer comprising polyurethane, polyester, polyester-modified polyurethane, epoxy or a combination thereof.

In some embodiments, the polymer binder may be an acrylic polymer having an acrylic content of 100% based on the total weight of the polymer binder. In some embodiments, the polymer binder may be an acrylic polymer having an acrylic content of 100% based on the total weight of the polymer binder.

Non-limiting examples of wax include paraffin wax (i.e. petroleum derived wax), polyolefin wax, as well as naturally occurring waxes and blends thereof. Non-limiting examples of polyolefin wax include high density polyethylene ("HDPE") wax, polypropylene wax, polybutene wax, polymethypentene wax, and combinations thereof. Naturally occurring waxes may include plant waxes, animal waxes, and combination thereof. Non-limiting examples of animal waxes include beeswax, tallow wax, lanolin wax, animal fat based wax, and combinations thereof. Non-limiting examples of plant waxes include soy-based wax, carnauba wax, ouricuri wax, palm wax, candelilla wax, and combinations thereof. In a preferred embodiment, the wax is paraffin wax.

Non-limiting examples of medium oil include the reaction product of a polycarboxylic acid and a polyhydric alcohol, in which the acid may be a saturated acid or an alpha, beta unsaturated acid, but preferably those, which are saturated.

Non-limiting examples of saturated polycarboxylic acids include oxalic, malonic, succinic, glutaric, sebacic, adipic, pimelic, suberic, azelaic, tricarballyic, citric, tartaric, and maleic. Phthalic acid and terepthalic acid may also be used in the preparation of the alkyd resins in the same proportions as the saturated polycarboxylic acids. Additionally, one may use such unsaturated acids asmaleic, fumaric, itaconic, citraconic, and the like. These acids and other comparable acids, their esters, and their anhydrides may be used in the preparation of these alkydresins. These acids may be used either singly or in combination with one another.

Non-limiting examples of polyhydric alcohols may include ethylene glycol, diethylene glycol, dimethylene glycol, tetramethylene glycol, pinacol, trimethylol propane, trimethylol ethane, mannitol, dulcitol, sorbitol, glycerol, pentaerythritol, dipentaerythritol, and the like. The polyhydric alcohols may be used either singly or in combination with one another in the esterification reaction in the preparation of the alkyd resin.

Additionally, the chain stopped oils may be esterification reaction product of an oil, such as castor oil, linseed oil, chaulmoogra oil, cherry kernel oil, cod liver oil, corn oil, hemp seed oil, grape seed oil, hazel nut oil, candlenut oil, lard oil, soya oil, coconut oil, cottonseed oil, tung oil, perilla oil, oiticica oil, fish oil, olive oil, peach kernel oil, peanut oil, pistachio nut oil, rape seed oil, and the like.

According to some embodiments, the oils comprising hydroxyl functionality may be further reacted with an isocyanate-functional compound to produce medium oil of polyurethane alkyd emulsion.

According to the present invention, the term "medium oil" refers to an oil formed from a reactive mixture of fatty acids and hydroxyl-functional compounds, whereby the resin mixture comprises about 40 wt. % to about 60 wt. % of the fatty acids. Additionally, the term "long oil" refers to an oil formed from a reactive mixture of fatty acids and hydroxyl-functional compounds, whereby the mixture comprises more than about 60 wt. % of the fatty acids. Additionally, the term "short oil" refers to resin mixture of fatty acids and hydroxyl-functional compounds, whereby the resin mixture comprises less than about 40 wt. % of the fatty acids. The amount of fatty acid in the reaction mixture dictates the chain length of the resulting oil resin—whereby less fatty acid results in a short chain length and more fatty acid results in longer chain length.

The hydrophobic polymer may be present in an amount ranging from about 70 wt. % to about 100 wt. %—including all values and sub-ranges there-between—based on the total weight of the moisture barrier composition.

Generally, the coating 500 may be applied directly to one of the first major surface 111, the second major surface 112, and/or the side surface 113 of the body 100, optionally with the addition of a carrier such as water. Each of the first sub-layer 540 and/or the third sub-layer 560 may each be applied in the wet-state, whereby the carrier is selected from water, VOC-based solvent, and combinations thereof. The inorganic coating of the second sub-layer 550 may be applied in the wet-state, whereby the carrier is water and is substantially free of VOC-based solvent.

The coating 500—including each sub-layer 540, 550, 560—may be applied by spray, roll-coating, dip coating, curtain coating, brushing, blade coating, or the like, followed by drying and/or curing (optionally with the addition of heat) for a period of time to form the coating 500 atop at least one of the first major surface 111, the second major surface 112, and/or the side surface 113 of the body 100—as discussed in greater detail herein.

The first sub-layer 540 may be applied in the wet-state directly to at least one of the first major surface 111, second major surface 112, and/or side surface 113 of the body 100. In the wet-state, the first sub-layer 540 may comprise a carrier in an amount ranging from about 50 wt. % to about 85 wt. %—including all values and sub-ranges there-between—based on the total weight of the wet-state first sub-layer 540. In the wet-state, the first sub-layer 540 may be applied in an amount such that the first sub-layer 540 has a wet thickness ranging from about 0.5 mils to about 2.5 mils—including all values and sub-ranges there-between. The carrier may be selected from water, an organic solvent, or a combination thereof. In a preferred embodiment, the wet-state sealant composition is a waterborne system having a carrier of water and a low VOC (i.e., volatile organic compound) content—i.e. substantially free of VOC solvents.

The first sub-layer 540 in the wet-state may then be cured or dried (optionally with the addition of heat) for a first time period, thereby forming the first sub-layer 540 atop the body 100.

The resulting first sub-layer 540 may comprise a first sub-layer upper surface 541 and a first sub-layer lower surface 542 opposite the first sub-layer upper surface 541. The first sub-layer 540 may have a first sub-layer thickness "$t_{C1}$" as measured from the first sub-layer upper surface 541 to the first sub-layer lower surface 542. The first sub-layer thickness $t_{C1}$ may range from 0.1 mils to 1.0 mils—including all values and sub-ranges there-between. The first sub-layer 540 may comprise a first sub-layer side surface 543 that extends from the first sub-layer upper surface 541 to the first sub-layer lower surface 542 and forms a perimeter of the first sub-layer 540.

As previously discussed, the body 100 may be formed from a cellulosic material, which comprises pores. Thus, once the first sub-layer 540 is applied to one of the first major surface 111, second major surface 112, and/or side surface 113 of the body 100, at least a portion of the first sub-layer 540 may penetrate into and seal the pores cellulosic material in a direction extending from one of the first major surface 111, second major surface 112, and/or side surface 113 of the body 100 toward the center of the body 100. The first sub-layer 540 in the wet-state may then be dried, optionally, at an elevated temperature, thereby rendering the first sub-layer 540 in the dry state.

The second sub-layer 550 may be formed by directly applying the previously discussed inorganic composition in the wet-state to the first sub-layer upper surface 541 of the first sub-layer 540. In the wet-state, the second sub-layer 550 may be applied in an amount such that the second sub-layer 550 has a wet thickness ranging from about 0.1 mils to about 1.0 mils—including all values and sub-ranges there-between.

The inorganic composition may then be dried (optionally with the addition of heat) for a second time period of time, thereby forming the second sub-layer 550 atop the first sub-layer 540. The resulting second sub-layer 550 may comprise a second sub-layer upper surface 551 and a second sub-layer lower surface 552 opposite the second sub-layer upper surface 551. The second sub-layer 550 in the wet-state may be dried at a temperature ranging from about 190° F. to about 300° F.—including all temperatures and sub-ranges there-between. In a preferred embodiment, the second sub-layer 550 in the wet-state may be dried at a temperature ranging from about 200° F. to about 290° F.—including all temperatures and sub-ranges there-between.

The second sub-layer 550 may have a second sub-layer thickness "$t_{C2}$" as measured from the second sub-layer upper surface 551 to the second sub-layer lower surface 552. The second sub-layer thickness $t_{C2}$ may range from about 0.02 mils to about 0.7 mils. The second sub-layer 550 may comprise a second sub-layer side surface 553 that extends from the second sub-layer upper surface 551 to the second sub-layer lower surface 552 and forms a perimeter of the second sub-layer 550.

The first sub-layer side surface 543 and the second sub-layer side surface 553 may form at least a portion of the coating side surface 513. Stated otherwise, the coating side surface 513 may comprise the first sub-layer side surface 543 and the second sub-layer side surface 553. The overall coating thickness $t_C$ of coating 500 may be the summation of the first sub-layer thickness $t_{C1}$ and the second sub-layer thickness $t_{C2}$—as follows:

$$t_C = t_{C1} + t_{C2}$$

According to these embodiments, the first sub-layer lower surface 542 of the first sub-layer 540 may directly contact one of the first major surface 111, the second major surface 112, and/or the side surface 113 of the body 100. The first sub-layer upper surface 541 may contact the second sub-layer lower surface 552 of the second sub-layer 550. The second sub-layer upper surface 551 may form at least part of the upper coating surface 511 of the coating 500. The first sub-layer lower surface 542 may form at least part of the lower coating surface 512 of the coating 500. The second sub-layer upper surface 551 may form at least part of the upper major surface 11 of the building panel 10.

The first sub-layer 540 may form a physical barrier that at least partially separates at least one of the first major surface 111, the second major surface 112, and/or the side surface 113 of the body 100 from the second sub-layer 550. The physical barrier formed by the first sub-layer 540 may prevent at least some of the second sub-layer 550 (which comprises the glass-forming composition) from penetrating at least one of the first major surface 111, the second major surface 112, and/or the side surface 113 into the body 100 (e.g., a body 100 formed from cellulosic material having porous surfaces). According to some embodiments, the silicate glass heat-insulative barrier that is created by glass-forming composition of the second sub-layer 540 may be separated from at least one of the first major surface 111, second major surface 112, and/or side surface 113 of the body 100 by a distance equal to the first sub-layer thickness $t_{C1}$.

Referring now to FIG. 4, other embodiments provide that the coating 500 may further comprise a third sub-layer 560 atop the second sub-layer 550, which is atop the first sub-layer 540 that is atop one of the first major surface 111, the second major surface 112, and/or the side surface 113 of the body 100. The third sub-layer 560 may be formed from a moisture barrier composition that imparts moisture barrier properties to the resulting third sub-layer 560.

The third sub-layer 560 may be formed by applying the moisture barrier composition with the addition of one or more organic solvents. Non-limiting examples of organic solvents include toluene, ethanol, acetone, butyl acetate, methyl ethyl ketone, ethyl 3-ethoxypropionate. The barrier composition may be present relative to the organic solvent in a weight ratio ranging from about 5:1 to about 1:20. After application to the second sub-layer upper surface 551, the moisture barrier composition may be dried for a third period of time, optionally at an elevated temperature, sufficient to drive off any organic solvent. The resulting third sub-layer 560 may be a continuous or discontinuous coating having a third sub-layer upper surface 561 and a third sub-layer lower surface 562 opposite the third sub-layer upper surface 561.

In the wet-state, the third sub-layer 560 may be applied in an amount such that the third sub-layer 560 has a wet thickness ranging from about 1.0 mils to about 10.0 mils— including all values and sub-ranges there-between. After drying, the third sub-layer 560 in the dry-state may have a third sub-layer thickness "$t_{C3}$" as measured from the third sub-layer upper surface 561 to the third sub-layer lower surface 562. The third sub-layer thickness $t_{C3}$ may range from about 1 mils to about 6 mils. The third sub-layer 560 may comprise a third sub-layer side surface 563 that extends from the third sub-layer upper surface 561 to the third sub-layer lower surface 562 and forms a perimeter of the second sub-layer 560.

According to such embodiments, the overall coating thickness $t_C$ of coating 500 may be the summation of the first sub-layer thickness $t_{C1}$, the second sub-layer thickness $t_{C2}$, and the third sub-layer thickness $t_{C3}$—as follows:

$$t_C = t_{C1} + t_{C2} + t_{C3}$$

According to these other embodiments, the first sub-layer lower surface 542 of the first sub-layer 540 may contact the upper cellulosic surface 411 of the cellulosic layer 400. The first sub-layer upper surface 541 may contact the second sub-layer lower surface 552 of the second sub-layer 550. The second sub-layer upper surface 551 may contact the third sub-layer lower surface 562 of the third sub-layer 560. The third sub-layer upper surface 561 may form at least part of the upper coating 511 of the coating 500. The first sub-layer lower surface 542 may form at least part of the lower coating surface 512 of the coating 500. The third sub-layer upper surface 561 may form at least part of the upper major surface 11 of the building panel 10.

According to other embodiments, the coating 500 may comprise only the second sub-layer 550 and the third sub-layer 560 without the first sub-layer 540 (not pictured). In such embodiments, the second sub-layer 550 may be directly atop one of the first major surface 111, second major surface 112, and/or side surface 113 of the body 100 and the third sub-layer 560 may be directly atop the second sub-layer upper surface 551 of the second sub-layer 550. In such embodiments, the second sub-layer 550 comprising the glass-forming composition of the inorganic composition acts as an insulative barrier capable of protecting the one of the first major surface 111, second major surface 112, and/or side surface 113 of the body 100 from fire.

According to other embodiments, the coating 500 may comprise only the second sub-layer 550. In such embodiments, the second sub-layer 550 acts as a flame retardant layer and is capable of protecting one of the first major surface 111, second major surface 112, and/or side surface 113 of the body 100 by acting as an insulative barrier created from the glass-forming composition of the inorganic composition, in situations where moisture resistance of the coating is not required.

Referring now to FIGS. 2-4, the body 100 may comprise a cellulosic layer 400, whereby the coating 500 is applied directly to the cellulosic layer 400. In other embodiments where the body 100 may be a laminate structure comprising multiple layers that includes a cellulosic layer 400 atop a substrate layer 200 with an adhesive layer 300 positioned there-between. The body 100 may also comprise the substrate layer 200 without the cellulosic layer 400 or adhesive layer 200, whereby the coating 500 is applied to at least one surface of the substrate layer 200—as discussed further herein.

Referring to FIG. 2, the cellulosic layer 400 may comprise an upper cellulosic surface 411 and a lower cellulosic surface 412 opposite the upper cellulosic surface 411. The cellulosic layer 400 may comprise a cellulosic side surface 413 that extends from the upper cellulosic surface 411 to the lower cellulosic surface 412 and forms a perimeter of the cellulosic layer 400. The cellulosic side surface 413 may form a portion of the side surface 113 of the body 100. Stated otherwise, the side surface 113 of the body 100 may comprise the cellulosic side surface 413. The side surface 113 of the body 100 may form a major side surface 13 of the building panel 10. The first major surface 111 of the body 100 may comprise the upper cellulosic surface 411.

The cellulosic layer 400 may have a cellulosic layer thickness "$t_{CL}$" as measured by the distance between the upper and lower cellulosic surfaces 411, 412. The cellulosic layer thickness $t_{CL}$ may range from about 10 mils to about 3,000 mils—including all values and sub-ranges there-between. In some embodiments, the cellulosic layer 400 may form a veneer that is bonded to the substrate layer 200 by the adhesive layer 300, whereby the cellulosic thickness $t_{CL}$ may range from about 10 mils to about 100 mils—including all values and sub-ranges there-between. In other embodiments, the cellulosic layer 400 may form the entirety of the body 100, whereby the cellulosic thickness $t_{CL}$ may range from about 300 mils to about 3,000 mils—including all values and sub-ranges there-between.

The cellulosic layer 400 may be formed from a cellulosic material such as wood, bamboo, and a combination thereof, and may be naturally occurring or engineered. Non-limiting examples of wood include cherry, maple, oak, walnut, pine, poplar, spruce, chestnut, mahogany, rosewood, teak, ash, hickory, beech, birch, cedar, fir, hemlock, basswood, alder wood, obeche wood, and combinations thereof. The cellulosic layer 400 may comprise pores that are not only present within the body of the cellulosic layer 400 but also exposed on at least one of the upper cellulosic surface 411, lower cellulosic surface 412, and/or the cellulosic side surface 413. The porosity of the cellulosic layer 400 will depend on the bamboo or type of wood selected as the material that forms the cellulosic layer 400.

The benefit of using a cellulosic layer 400 is that the resulting building panel 10 will exhibit authentic decorative features 30 of real wood and/or bamboo (e.g., wood grain, knots, burl, etc.) while minimizing the overall thickness required for the building panel 10 without necessitating artificial print layers. Artificial print layers, such as those on various papers or plastics, have been used as a way to recreate wood grain, knots, burl, etc., while minimizing layer thickness. Such print layers, however, are undesirable because of the limited amount of variation the cellulosic pattern across a large number of panels as compared to the same large number of panels that use cellulosic layers formed from real wood and/or bamboo. Stated otherwise, artificial print layers are not preferred because of the repetition in the decorative pattern over large installation areas.

Although not limited to this embodiment, the coating 500 may be directly atop the upper cellulosic surface 411, the lower cellulosic surface 412, and/or the cellulosic side surface 413 of the cellulosic layer 400. The coating 500 may be applied to the cellulosic layer 400 such that the lower coating surface 512 is in direct contact with the upper cellulosic layer surface 412. In such embodiments, the lower coating surface 512 may directly contact the upper cellulosic surface 411, such that the upper coating surface 511 forms at least a portion of the upper major surface 11 of the building panel 10.

Referring now to FIG. 2, according to some embodiments of the present invention the building panel 10 may include cellulosic layer 400 being adhesively bonded to the substrate layer 200 by an adhesive layer 300. The combination of layers 200, 300, 400, 500 of the present invention creates a laminate structure having high lamination integrity in a ceiling system under both standard conditions (i.e. daily operation of an interior building environment) but also during exposure to the extreme heat and temperature that may result from a fire.

The substrate layer 200 may comprises an upper substrate surface 211 and a lower substrate surface 212 that is opposite the upper substrate surface 211. The substrate layer 200 may comprise a substrate side surface 213 that extends from the upper substrate surface 211 to the lower substrate surface 212 and forms a perimeter of the substrate layer 200. The substrate side surface 213 may form a portion of the side surface 113 of the body 100. Stated otherwise, the side surface 113 of the body 100 may comprise the substrate side surface 213.

The substrate layer 200 may be formed from a metallic material, ceramic material, or composite material. Non-limiting examples of metallic material include aluminum, steel, and iron. In a preferred embodiment, the substrate layer 200 is formed from aluminum. The substrate layer 200 may have a substrate thickness "$t_S$" ranging from about 20 mils to about 100 mils—including all values and sub-ranges there-between. The substrate thickness $t_S$ may range from about 25 mils to about 80 mils. In a preferred embodiment, the substrate thickness $t_S$ ranges from about 30 mils to about 65 mils—including all values and sub-ranges there-between.

The adhesive layer 300 may comprises an upper adhesive surface 311 and a lower adhesive surface 312 opposite the upper adhesive surface 311. The adhesive layer 300 may comprise an adhesive side surface 313 that extends from the upper adhesive surface 311 to the lower adhesive surface 312 and forms a perimeter of the adhesive layer 300. The adhesive side surface 313 may form a portion of the side surface 113 of the body 100. Stated otherwise, the side surface 113 of the body 100 may comprise the adhesive side surface 213. The adhesive layer 300 may have an adhesive thickness "$t_A$" ranging from about 2 mils to about 20 mils—including all values and sub-ranges there-between—as measured from the upper adhesive surface 311 to the lower adhesive surface 312. In a preferred embodiment, the adhesive thickness $t_A$ ranges from about 5 mils to about 15 mils—including all values and sub-ranges there-between.

According to embodiments where the building panel 10 has the laminate structure, the overall panel thickness $t_P$ of the building panel 10 may be the summation of the substrate thickness $t_S$, the adhesive thickness $t_A$, the cellulosic layer thickness $t_{CL}$, and the coating thickness $t_C$ as follows:

$$t_P = t_S + t_A + t_{CL} + t_C$$

The upper substrate surface 211 of the substrate layer 200 may directly contact the lower adhesive surface 312 of the adhesive layer 300 and the upper adhesive surface 311 of the adhesive layer 300 may directly contact the lower cellulosic surface 412 of the cellulosic layer 400 such that the adhesive layer 300 adhesively bonds together the cellulosic layer 400 and the substrate layer 200. The lower coating surface 512 may directly contact the upper cellulosic surface 411, such that the upper coating surface 511 forms at least a portion of the upper major surface 11 of the building panel 10. In such embodiments, the lower substrate surface 212 may form at least a portion of the lower major surface 12 of the building panel 10.

The adhesive layer 300 may be formed from an adhesive composition that is a hot-melt composition, water-based polyvinyl acetate adhesive, and combinations thereof. According to the purposes of the present invention, the term "hot-melt adhesive composition" means a composition having a melt viscosity that ranges from about 10,000 centipoise to about 40,000 centipoise at a temperature of about 275° F.—including all values and sub-ranges there-between. The hot-melt adhesive composition may be solid at room temperature and be substantially free of solvent. The adhesive composition may comprise adhesive polymer in an amount ranging from about 50 wt. % to about 100 wt. % based on the total weight of the adhesive composition—including all values and sub-ranges there-between.

The adhesive polymer according to the present invention may be a thermoplastic polymer. Non-limiting examples of the thermoplastic polymer may include moisture cured polyester modified polyurethane polymers. Such polyester modified polyurethanes may be formed by reacting organic diisocyanate with difunctional polyester polyol and low molecular weight diols (as chain-extending agents) at a non-limiting NCO:OH ratio of about 0.7:1 to about 1.3:1—including all sub-ranges and ratios there-between.

Non-limiting examples of polyester polyol include di-functional polyester diols containing alcoholic hydroxyl groups. Suitable polyester diols are polyester having average molecular weights of from 800 to 5000 and preferably from 2000 to 4000 produced from (i) dicarboxylic acids containing at least 6 carbon atoms, such as adipic acid, pimelic acid, suberic acid, azelaic acid and/or sebacic acid (preferably adipic acid, as the sole acid component) and (ii) alkane diols that may contain at least 4 carbon atoms, such as, for example, 1,4-dihydroxy-butane, 1,5-dihydroxypentane and/or 1,6-dihydroxy-hexane. Polycondensates of ω-hydroxyalkane-mono-carboxylic acids and the polymers of their lactones are also suitable, although less preferred.

Low molecular weight diols suitable as chain-extending agents in accordance with the present invention include, in particular, aliphatic diols having average molecular weight of from 62 to 400 or mixtures thereof. Non-limiting examples of such diols include ethylene glycol, 1,3-dihydroxy-propane, 1,4-dihydroxy-butane, 1,5-dihydroxypentane, 1,6-dihydroxyhexane, and the like.

Non-limiting examples of suitable aromatic polyisocyanates include all isomers of toluylene-diisocyanate (TDI), naphthalene-1,5-diisocyanate, diphenylmethane-4,4'-diisocyanate (MDI), diphenylmethane-2,4'-diisocyanate and mixtures of 4,4'-diphenylmethane-diisocyanate with the 2,4' isomer or mixtures thereof with oligomers of higher functionality (so-called crude MDI), xylylene-diisocyanate (XDI), 4,4'-diphenyl-dimethylmethane-diisocyanate, di- and tetra-alkyl-diphenylmethane-diisocyanate, 4,4'-dibenzyl-diisocyanate, 1,3-phenylene-diisocyanate and 1,4-phenylene-diisocyanate. Examples of suitable cycloaliphatic polyisocyanates are the hydrogenation products of the above-mentioned aromatic diisocyanates, such as 4,4'-dicyclohexylmethane-diisocyanate ($H_{12}$MDI), 1-isocyanatomethyl-3-isocyanato-1,5,5-trimethyl-cyclohexane (isophorone-diisocyanate, IPDI), cyclohexane-1,4-diisocyanate, hydrogenated xylylene-diisocyanate ($H_6$XDI), 1-methyl-2, 4-diisocyanato-cyclohexane, m- or p-tetramethylxylene-diisocyanate (m-TMXDI, p-TMXDI) and dimer-fatty acid diisocyanate. Examples of aliphatic polyisocyanates are tetramethoxybutane-1,4-diisocyanate, butane-1,4-diisocyanate, hexane-1,6-diisocyanate (HDI), 1,6-diisocyanato-2,2,4-trimethylhexane, 1,6-diisocyanato-2,4,4-trimethylhexane and 1,2-dodecane-diisocyanate ($C_{12}$DI).

The adhesive composition of the present invention may further comprise additives selected from the group consisting of 2,2'-dimorpholinethyl ether catalyst, di(2,6-dimethyl-morpholinoethyl)ether catalyst, adhesion promoters, diluents, plasticizers, fillers, antioxidants pigments, UV absorbers and combinations thereof. In other embodiments, the adhesive composition may further comprise a flame retardant. Non-limiting examples of flame retardant may include ammonium hydroxide, magnesium hydroxide, huntite, hydromagnesite, silica, polyphosphate, melamine cyanurate, chloride salts—such as sodium chloride, antimony oxide, and borates, such as calcium borate, magnesium borate, zinc borate, and combinations thereof. The flame retardant may be present in the adhesive composition in an amount ranging from about 0 wt. % to about 50 wt. % based on the total weight of the adhesive composition—including all values and sub-ranged there-between.

The building panel 10 of FIG. 2 may be formed heating the adhesive composition to an application temperature ranging from about 120° C. to about 165° C., and applying the adhesive composition to at least one of the upper substrate surface 211 or the lower cellulosic surface 412. The adhesive composition may be applied by roll coating, spray coating, dip coating, or the like. Within the open time of the adhesive (typically 30 to 60 seconds), the upper substrate surface 211 is mated to the lower cellulosic surface 412 with the adhesive composition being present there-between, thereby bonding the upper substrate surface 211 to the lower cellulosic surface 412 via the adhesive composition. Pressure may then be applied to at least one of the upper cellulosic surface 411 of the cellulosic layer 400 or the lower substrate surface 212 of the substrate layer 200 to ensure proper adhesive bonding.

Each sub-layer 540, 550, 560 may be individually applied by spray, roll-coating, dip coating, curtain coating, brushing, blade coating, or the like. Specifically, the first sub-layer 540 may be applied to the upper cellulosic surface 411 of the cellulosic layer 400. The first sub-layer 540 may then be optionally heated to a temperature ranging from about 150° F. to about 250° F. to partially or fully cure the first sub-layer 540. In a preferred embodiment, the first sub-layer 540 may then be heated to a temperature ranging from about 150° F. to about 175° F. to partially or fully cure the first sub-layer 540. The second sub-layer 550 may then be applied to the first sub-layer supper surface upper surface 541. The second sub-layer 550 may then be optionally heated to a temperature ranging from about 150° F. to about 250° F. to partially or fully cure the second sub-layer 550.

The third sub-layer 560 may then be applied to the second sub-layer upper surface 551. The third sub-layer 560 may then be optionally heated to a temperature ranging from about 15° C. to about 90° C. to partially or fully cure the third sub-layer 560—thereby resulting in the laminate structure of the present invention. The laminate structure may then be heated in an oven to fully cure the adhesive layer 300 and the coating 500 for a fourth period of time.

According to the present invention, the low drying temperature of each of the first and second sub-layers 540, 550 allow for the cellulosic layer 400 to retain residual moisture therein. When the resulting building panel 10 is subject to high heat (e.g., during a fire), the residual moisture contained within the cellulosic layer 400 may be converted to a gaseous state, thereby causing the resulting silicate glass to bulge outward form the cellulosic layer 400. The silicate glass is strong enough that even under such deformation, the resulting coating 500 does not fracture (e.g., pop). By allowing for such low drying temperatures, the first and/or second sub-layer formulations of the present invention enhance the insulative barrier properties by creating a bubble in the coating 500 during exposure to high heat that further separates the underlying cellulosic layer 400 from the surround flames.

According to the present invention, the coating 500 applied to the cellulosic layer 400 provides an aesthetically pleasing building panel 10 such that the decorative features 30 of the cellulosic layer are visible from the upper major surface 11 of the building panel 10 because the decorative coating 500 is substantially clear. Furthermore, the inorganic composition of the coating 500 helps provide an insulative heat-barrier to the cellulosic layer 400, thereby helping prevent the cellulosic layer 400 from igniting during a fire and propagating through the building panel 10.

Referring to FIG. 5, the building panel 10 of the present invention may be a ceiling panel (as shown installed in the ceiling system of FIG. 5), a wall panel, or the like. The lower major surface 12 of the ceiling panel 10 of the present invention may face the plenum space 3 of an interior space of a ceiling system 1. The upper major surface 11 of the ceiling panel 10 of the present invention may face the active space 2 of an interior space of a ceiling system 1.

In non-exemplified embodiments, the present invention may include a building panel having an upper major surface opposite a lower major surface, the building panel comprising a cellulosic layer (also referred to as "cellulosic body" in this embodiment) and a coating. The cellulosic body is self-supporting and comprises an upper cellulosic surface and a lower cellulosic surface opposite the upper cellulosic surface. Non-limiting examples of a cellulosic body may include MDF board, wooden planks, or the like. The cellulosic body may have a cellulosic body thickness as measured from the lower cellulosic surface to the upper cellulosic surface that ranges up to about 3 inches—including all values and sub-ranges there-between.

With the coating 500 being formed at drying temperatures as low as 150° F., the cellulosic body may at least partially retain pre-existing moisture already contained within the cellulosic body. The surprising benefit of retaining the pre-existing moisture is that during exposure to high-heat, the retained moisture is converted to steam and driven out of the cellulosic body. As the steam escapes from the body 100, the glass layer formed from the coating 500 is pushed outward from the body 100, thereby increasing the distance between the body 100 and the surrounding flame or high-heat—thereby decreasing the likelihood that the body 100 ignites. Stated otherwise, it has been surprisingly discovered that the coatings 500 of the present invention further enhance fire repellency in the building panels 10 by allowing for drying temperatures below 212° F. under atmospheric conditions (at 1 atm).

The building panel 10 of such embodiments may have the coating 500 applied to at least one of the upper cellulosic surface 411 or the lower cellulosic surface 412 of the cellulosic layer 400. The coating 500 comprises an upper coating surface 511 opposite a lower coating surface 512, whereby the lower coating surface 512 of the coating 500 may directly contact the upper cellulosic surface 411 of the cellulosic body 400. The coating 500 comprises at least the second sub-layer 550 and optionally the first sub-layer 540 and/or the third sub-layer 560, as previously discussed. The upper major surface 11 of the building panel 10 may comprise the upper coating surface 511 of the coating 500. According to some embodiments, the lower major surface 12 of the building panel 10 may be uncoated, whereby the lower major surface 12 of the building panel 10 does not comprise the coating 500, but rather the lower cellulosic surface 412 or the lower substrate surface 212.

Figure 8:
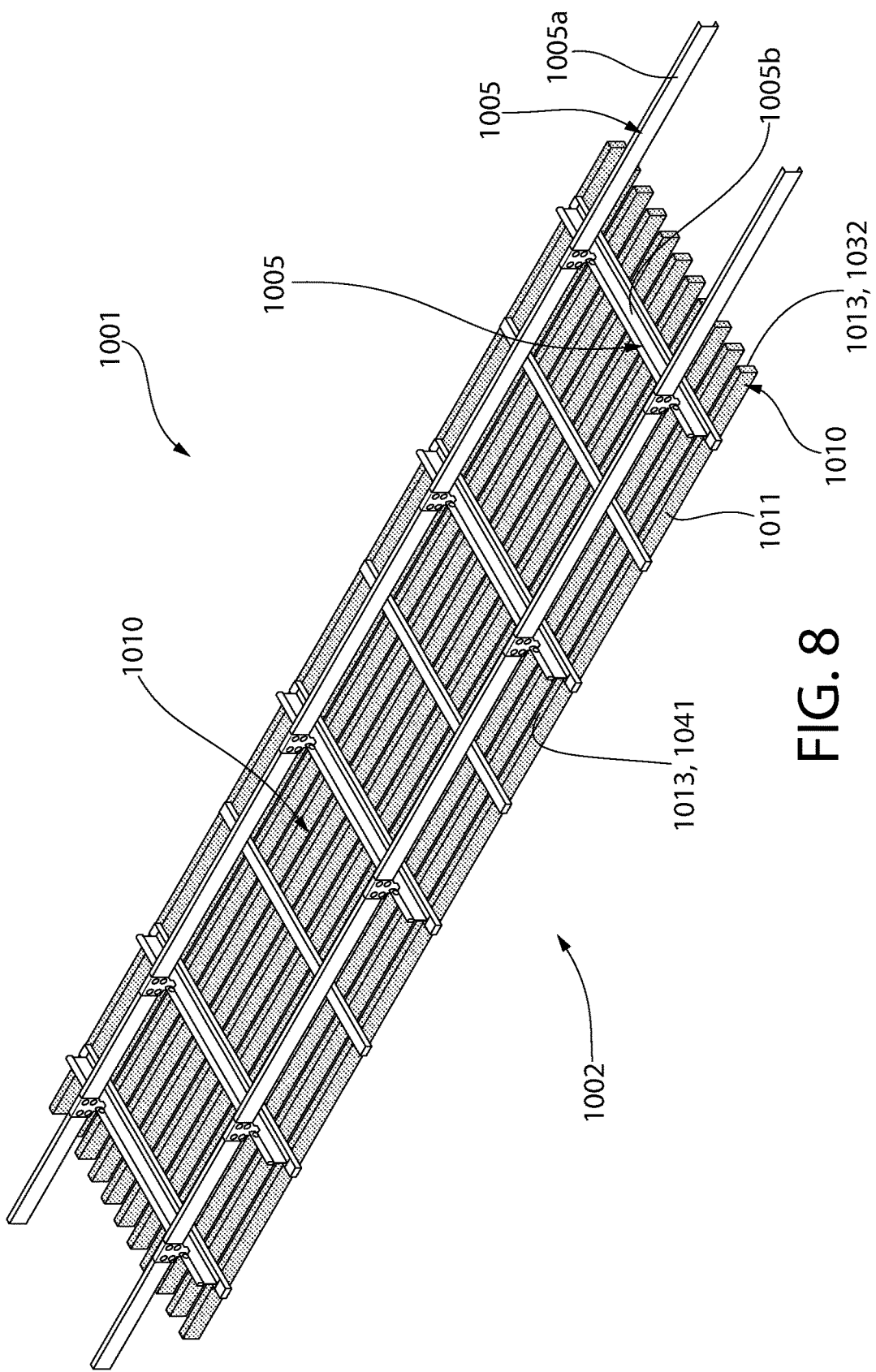
FIG. 8 is a ceiling system comprising the building panel of FIG. 6.

Referring now to FIGS. 6-8, a building panel 1010 and ceiling system 1001 are illustrated in accordance with another embodiment of the present invention. The building panel 1010 is similar to the building panel 10 except as described herein below. The description of the building panel 10 above generally applies to the building panel 1010 described below except with regard to the differences specifically noted below. A similar numbering scheme will be used for the building panel 1010 as with the building panel 10 except that the 1000-series of numbers will be used. Additionally, the ceiling system 1001 is similar to the ceiling system 1 except as described herein below. The description of the ceiling system 1 above generally applies to the ceiling system 1001 described below except with regard to the differences specifically noted below. A similar numbering scheme will be used for the ceiling system 1001 as with the ceiling system 1 except that the 1000-series of numbers will be used.

The coating 1500 of the present invention may be applied to one of the first major surface 1111, second major surface 1112, and/or side surface 1113 of the body 1100. In a preferred embodiment, the coating 1500 is applied to each of the first major surface 1111, the second major surface 1112, and the side surface 1113 of the body 1100 such that coating 1500 encapsulates the body 1100. Stated otherwise, the coating 1500 may form a continuous barrier that substantially surrounds the entire body 1100.

Although not pictured, the coating 1500 of this embodiment comprises the second sub-layer 550, and may further comprise each of the first sub-layer 540 and/or third sub-layer 560, as previously discussed with respect to FIGS. 2-4.

In these embodiments, the body 1100 may formed entirely from the cellulosic layer 400. The body 1100 may alternatively be formed from the laminate structure. According to the embodiments where the body 1100 is formed entirely from the cellulosic layer 400, the overall panel thickness $t_P$ may be the summation of cellulosic layer thickness $t_{CL}$, and the coating thickness $t_C$ as follows:

$$t_P = t_{CL} + [n \times t_C]$$

whereby the "n" refers to the number of major surfaces of the body 1100 coated with the coating 1500. In this embodiment, the first and second major surfaces 1111, 1112 of the body 1100 are coated and n=2. In such embodiments, the panel thickness $t_P$ may range from about 500 mils to about 2,000 mils—including all values and sub-ranges there-between.

According to the embodiments where the body 1100 is formed entirely from the substrate layer 200, the overall panel thickness $t_P$ may be the summation of substrate layer thickness $t_S$, and the coating thickness $t_C$ as follows:

$$t_P = t_S + [n \times t_C]$$

whereby the "n" refers to the number of major surfaces of the body 1100 coated with the coating 1500. In this embodiment, the first and second major surfaces 1111, 1112 of the body 1100 are coated and n=2. In such embodiments, the panel thickness $t_P$ may range from about 100 mils to about 600 mils—including all values and sub-ranges there-between.

Referring now to FIG. 8, the building panel 1010 of these embodiments may be installed into a ceiling system 1001 comprising a support 1005 that includes a first support member 1005a and a second support member 1005b. The first and second support members 1005a, 1005b may be arranged in an intersecting pattern to form a support grid. A plurality of the building panels 1010 may be arranged in an array and attached to the support grid such that the upper major surface of one building panel 1010 faces the lower major surface of a second building panel 1010 that is adjacent to the first building panel 1010. The plurality of the building panels 1010 may also be arranged and attached to the support grid such that the plurality of building panels 1010 comprises a first side 1041 opposite a second side 1042, whereby the first side 1041 faces the plenum 1003 and the second side 1042 faces the room environment 1002—the first and second sides 1041, 1042 comprises the side surface 1013 of the building panels 1010.

The following examples are prepared in accordance with the present invention. The present invention is not limited to the examples described herein.

EXAMPLES

Experiment 1

A first experiment was performed to test the water-impervious nature of the barrier coatings of the present invention. The first set of experiments were prepared by applying barrier coating compositions to building panels pre-coated with an inorganic flame-retardant coating.

1 cc of water was applied to each dried barrier coating, forming a localized puddle atop the barrier coating. The liquid water repellency of each barrier coating was characterized by the total amount of time between first application of the water and when each puddle began to soak into the barrier coating (or when the surface tension on the barrier coating breaks). The composition of each barrier coating as well as the resulting liquid water repellency are set forth below in Table 1.

TABLE 1

|  | Comp. Ex. 1 | Comp. Ex. 2 | Comp. Ex. 3 | Comp. Ex. 4 | Ex. 1 | Ex. 2 | Ex. 3 | Ex. 4 |
| --- | --- | --- | --- | --- | --- | --- | --- | --- |
| Water (wt. %) | 39.5 | 39.5 | 39.5 | 32.2 | 39.5 | 32.2 | 36.1 | 22.8 |
| Latex 1 (wt. %) | 49.4 | — | — | — | — | — | — | — |
| Latex 2 (wt. %) | — | 49.4 | — | — | — | — | — | — |
| Latex 3 (wt. %) | — | — | 49.4 | — | — | — | — | — |
| Latex 4 (wt. %) | — | — | — | — | 49.4 | — | 45.2 | 66.7 |
| Polyurethane (wt. %) | — | — | — | — | — | — | 10.8 | — |
| Wax (wt. %) | 7.9 | 7.9 | 7.9 | — | 7.9 | — | 4.5 | — |
| Oil 1 + Drying Agent | — | — | — | 65.0 | — | — | — | — |
| Oil 2 + Drying Agent | — | — | — | — | — | 65.0 | — | — |
| Oil 3 + Drying Agent | — | — | — | — | — | — | — | 8.2 |
| Silane (wt. %) | 1.7 | 1.7 | 1.7 | 2.0 | 1.7 | 2.0 | 2.0 | 2.0 |
| Additive | 1.5 | 1.5 | 1.5 | 0.8 | 1.5 | 0.8 | 1.4 | 0.3 |
| Total (wt. %) | 100.0 | 100.0 | 100.0 | 100.0 | 100.0 | 100.0 | 100.0 | 100.0 |
| Solid's Content | 25.3 | 32.8 | 30.3 | 35.1 | 29.3 | 37.7 | 29.7 | 37.5 |
| Liquid Water Repellency (minutes) | 80 | 60 | 30 | 120 | 180 | 210 | 240 | 300 |
| Water Vapor Permeable | Yes | Yes | Yes | Yes | Yes | Yes | Yes | Yes |

Each barrier coating of this experiment was formulated using the following:

Latex 1—styrene-acrylic polymer emulsion having a solids content of about 40 wt. %, a pH of about 8.5, and a glass transition temperature of about 36° C.

Latex 2—vinyl-acrylic polymer emulsion having a solids content of about 55 wt. %, a pH of about 5.0, and a glass transition temperature of about 19° C.

Latex 3—polyvinyl acetate polymer emulsion having a solids content of about 50 wt. %, a pH of about 7.0, and a glass transition temperature of about 37° C.

Latex 4—acrylic polymer emulsion having a solids content of about 33 wt. % and a glass transition temperature of about 10° C. The polymer of Latex 4 is 100% acrylic polymer Polyurethane—polyurethane emulsion having a solids content of about 33 wt. %

Oil 1—chain-stopped short oil alkyd emulsion having a solids content of about 51 wt. %, a pH of about 7.0-8.0, and formed from an oil resin comprising less than 40 wt. % of fatty acids Oil 2—chain-stopped medium oil alkyd emulsion having a solids content of about 55 wt. %, a pH of about 7.6 and formed from an oil resin comprising 40 wt. % to 60 wt. % of fatty acids Oil 3—medium oil of polyurethane alkyd emulsion having a solids content of about 40 wt. %, a pH of about 7.0-8.0 and formed from an oil resin comprising 40 wt. % to 60 wt. % of fatty acids Wax—wax emulsion having a solids content of about 40 wt. % and a pH ranging from about 8.0 to 10.0

Silane—(3-glycidoxypropyl) trimethoxysilane

Additive—blend of defoamer and non-ionic dispersant

Drying Agent—metal-based catalyst drying agent

Each barrier coating formulation was applied to a substrate and dried to a solid's content of >99%. Subsequently As demonstrated by Table 1, the barrier coating composition of Examples 1, 3, and 4—which comprise a blend of (i) latex polymer having a glass transition temperature of less than 18° C. and (ii) at least one co-component that is an emulsion provides an unexpected improvement in liquid-barrier performance by preventing soak-in or breakage in surface tension for at least 3 hours.

As also demonstrated by Table 1, the barrier coating composition of Example 2—which comprise an oil formed from an oil resin comprising 40 wt. % to 60 wt. % of fatty acids provides an unexpected improvement in liquid-barrier performance by preventing soak-in or breakage in surface tension for at least 3 hours.

Experiment 2

A second experiment was performed to test the improvement in bonding strength between the barrier coating and the inorganic flame-retardant coating due to the silane adhesion promoter of the present invention. This experiment tested the following silane adhesion promoters.

Silane 1 ("Silane 1")—3-methacryloxypropyl trimethoxysilane

Silane 2 ("Silane 2")—N-2-(Aminoethyl)-3-aminopropylmethyldimethoxysilane

Silane 3 ("Silane 3")—Aminoethyl aminopropyl trimethoxysilane

Silane 4 ("Silane 4")—Vinyl trimethoxysilane

Silane 5 ("Silane 5")—3-Acryloxypropyl trimethoxysilane

Silane 6 ("Silane 6")—3-Glycidoxypropyl trimethoxysilane

Starting with the coating composition of Example 2, five barrier coating compositions were prepared replacing the silane of Example 2 with silanes 1-5. The five barrier coating compositions were then applied to building panels comprising an inorganic flame-retardant coating of the present invention. Specifically, the barrier coatings were applied directly to the inorganic flame-retardant coatings. Each barrier coating was then dried to a solids content of >99% and tested for adhesion strength to the inorganic flame-retardant coating using ASTM test method D3359 (also referred to as "cross hatch" test). The crosshatch test includes making a crosshatch pattern through the barrier coating and inorganic flame-retardant coating to the underlying substrate. The detached flakes of barrier coating are removed by brushing with a soft brush. Pressure-sensitive tape is applied over the crosshatch cut, and the tape is smoothed into place by using a pencil eraser over the area of the incisions. Tape is removed by pulling it off rapidly back over itself as close to an angle of 180°. The amount of barrier coating that remains adhered can be assessed and assigned a value on a 0 to 5 scale—0 being the worst adhesion and 5 being perfect adhesion. The type of silane 1-5 and corresponding adhesion strength between the barrier coating and underlying inorganic flame-retardant coating composition is listed below in Table 2.

TABLE 2

|  | Comp. Ex. 5 | Comp. Ex. 6 | Comp. Ex. 7 | Comp. Ex. 8 | Comp. Ex. 9 | Ex. 5 |
|---|---|---|---|---|---|---|
| Coating Composition (wt. %) | 95 | 95 | 95 | 95 | 95 | 95 |
| Silane 1 (wt. %) | 5 | — | — | — | — | — |
| Silane 2 (wt. %) | — | 5 | — | — | — | — |
| Silane 3 (wt. %) | — | — | 5 | — | — | — |
| Silane 4 (wt. %) | — | — | — | 5 | — | — |
| Silane 5 (wt. %) | — | — | — | — | 5 | — |
| Silane 6 (wt. %) | — | — | — | — | — | 5 |
| Cross Hatch Test Results | 0 B | 0 B | 0 B | 0 B | 0B | 5 B |

As demonstrated by Table 2, the using silane 6 in combination with the barrier coating of the present invention provides an unexpected vast improvement in adhesion strength when using with the inorganic flame-retardant coatings of the present invention.

Additionally, two additional comparative coatings were prepared using the coating formulation of Example 2 except that in place of silane agents, non-silane based adhesion promoters were blended into the coating composition. Such non-silane adhesion promoters included the following:
Polyester Adhesion Promoter ("Polymer 1")
High molecular weight block copolymer ("Polymer 2")
Each of the comparative coatings using Polymer 1 and Polymer 2 resulted in a 0B adhesion strength for the top coating.

Experiment 3

A third experiment was performed to test the adhesion strength when using the silane agents added to the inorganic coating. For this experiment, Silane 2 was blended with the inorganic coating composition and a barrier coating was applied thereto. The barrier coating of this experiment did not contain silane adhesion promoter. In this experiment, the resulting adhesion strength of the barrier coating was measured to be 4/5B. Therefore, while Silane 2 was found to provide inadequate adhesion strength when added to the barrier coating, it was surprisingly discovered to help provide proper adhesion strength when added to the inorganic coating.

Experiment 4

A fourth experiment was performed to test the show the unexpected advantage gained by using the combination of flame retardants in the barrier coatings of the present invention. The third experiment was performed by blending together the barrier coating composition of the present invention with various flame retardants. Each flame-retardant containing barrier coating composition was then applied to a major surface of a building panel and dried to a solids content of >99%.

Each coated building panel was then positioned above a Bunsen burner angled at 30°, whereby the coated major surface faces the flame from the Bunsen burner. Each surface was exposure for a set predetermined amount of time, after which the amount of flame spread on each specimen was measured and assigned a value—the lower the Flame Spread Rating ("FSR") value, the better the coating was at imparting flame-retardancy to the underlying substrate.

TABLE 3

|  | Comp. Ex. 10 | Comp. Ex. 11 | Comp. Ex. 12 | Comp. Ex. 13 | Ex. 6 | Ex. 7 |
|---|---|---|---|---|---|---|
| Coating Composition (wt. %) | 100 | 80 | 80 | 80 | 80 | 80 |
| Alumina Trihydrate | — | 20 | — | — | 10 | 10 |
| Calcium Borosilicate | — | — | 20 | — | 10 | — |
| Zinc Borate | — | — | — | 20 | — | 10 |
| Flame Spread Rate | 26 | 21 | 39.5 | 31 | 8.5 | 14.5 |

As demonstrated by Examples 6 and 7 in Table 3, using a blend of two or more flame retardants in the barrier coatings of the present invention provided an unexpected improvement in overall flame-retardancy when compared to using a single flame retardant in the same overall amount. Additionally, as demonstrated by Example 4, it was surprisingly discovered that calcium borosilicate can provide extreme flame-retardancy when combined with a second flame retardant (in this example, alumina trihydrate) as compared to using calcium borosilicate individuals (as shown in Comp. Ex. 12), which performed worse than a barrier coating having no flame retardant at all (compare Comp. Ex. 10 to Comp. Ex. 12).

What is claimed is:
1. A building panel having a water-impervious surface comprising:
a body having a first major surface opposite a second major surface;
a barrier coating atop the first major surface of the body, the barrier coating consisting of a first component, a second component, defoamer, non-ionic dispersant, and silane, the first component consisting of a single latex polymer and the second component being selected from polyurethane emulsion, wax emulsion, and a combination thereof;
wherein the barrier coating has a solids content of at least 99% based on the total weight of the barrier coating, and wherein the first component and the second component are present in a weight ratio ranging from about 2:1 to about 20:1, and the latex polymer is an acrylic polymer having a glass transition temperature of less than 18° C.

2. The building panel according to claim 1, wherein the second component is polyurethane emulsion and wherein the ratio of the first component to the second component ranges from about 2.5:1 to about 10:1.

3. The building panel according to claim 1, wherein the second component is a wax emulsion.

4. The building panel according to claim 3, wherein the first component and the second component are present in a weight ratio ranging from 2.5:1 to about 10:1.

5. The building panel according to claim 1, wherein the second component is a combination of polyurethane emulsion and wax emulsion.

6. The building panel according to claim 1, wherein the building panel further comprises an inorganic coating positioned between the first major surface of the body and the barrier coating, the inorganic coating being optically transparent and flame retardant; and wherein the silane is 3-glycidoxypropyl trimethoxysilane.

7. A building panel having a flame-retardant surface comprising:
    a body having a first major surface opposite a second major surface;
    a barrier coating atop the first major surface of the body, the barrier coating comprising a first sub-layer contacting and atop the first major surface of the body and a second sub-layer contacting and top the first sub-layer, wherein;
        the second sub-layer comprises an organic blend composition;
        the first sub-layer comprises a first flame retardant composition comprising a first flame retardant that is alumina trihydrate and a second flame retardant that is either calcium borosilicate or zinc borate;
    wherein the barrier coating is substantially transparent such that the first major surface of the body is visible through the barrier coating; and
    wherein the first flame retardant and the second flame retardant are present in a weight ratio ranging from about 3:1 to about 1:3, and wherein the first flame retardant composition is present in an amount ranging from about 0.5 wt. % to about 30 wt. % based on the total weight of the barrier coating; and
    wherein the organic blend composition comprises a polyurethane alkyd emulsion, an acrylic polymer emulsion having a Tg of about 10° C., and a metal based drying agent.

8. The building panel according to claim 7, wherein the organic blend and the first flame retardant composition are present in a weight ratio ranging from about 10:1 to about 99:1.

9. The building panel according to claim 7, wherein the organic blend coating composition further comprises a silane adhesion promoter, wherein the organic blend and the silane adhesion promoter are present in a weight ratio ranging from about 4:1 to about 100:1.

10. The building panel according to claim 9, wherein the silane adhesion promoter is 3-glycidoxypropyl trimethoxysilane.

11. The building panel according to claim 9, wherein the silane adhesion promoter is present in an amount ranging from about 3 wt. % to about 15 wt. % based on the total weight of the barrier coating.

12. The building panel according to claim 7, wherein the first flame retardant composition comprises a third flame retardant that is different from the first and second flame retardant.

13. The building panel according to claim 7, wherein the organic blend composition further comprises a latex polymer having a glass transition temperature of about 10° C.

14. The building panel according to claim 7, wherein the first flame retardant and the second flame retardant are present in a weight ratio of about 1:1.

15. A building panel having a water-impervious surface comprising:
    a body having a first major surface opposite a second major surface;
    a barrier coating atop the first major surface of the body, the barrier coating comprising a silane adhesion promoter and an organic blend comprising:
        a first component consisting essentially of an acrylic latex polymer; and
        a second component comprising polyurethane emulsion and wax emulsion;
    wherein the barrier coating has a solids content of at least 99% based on the total weight of the barrier coating, and the latex polymer having a glass transition temperature of about 10° C.

16. The building panel according to claim 15, wherein the silane adhesion promoter is a glycidyl-functional compound and comprises alkoxy groups and the wax emulsion has a pH ranging from about 8.0 to about 10.0.

17. The building panel according to claim 15, wherein the first component consists of the acrylic latex polymer.

\* \* \* \* \*